United States Patent
Milliken

(10) Patent No.: US 8,059,551 B2
(45) Date of Patent: Nov. 15, 2011

(54) METHOD FOR SOURCE-SPOOFED IP PACKET TRACEBACK

(75) Inventor: Walter Milliken, Dover, NH (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 814 days.

(21) Appl. No.: 11/355,484

(22) Filed: Feb. 15, 2006

(65) Prior Publication Data

US 2006/0184690 A1 Aug. 17, 2006

Related U.S. Application Data

(60) Provisional application No. 60/652,932, filed on Feb. 15, 2005.

(51) Int. Cl.
*H04J 1/16* (2006.01)
*H04L 12/56* (2006.01)

(52) U.S. Cl. .................. 370/252; 370/389; 370/419

(58) Field of Classification Search .............. 370/389, 370/419, 252
See application file for complete search history.

(56) References Cited

U.S. PATENT DOCUMENTS

| | | |
|---|---|---|
| 5,414,833 A | 5/1995 | Hershey et al. |
| 5,623,600 A | 4/1997 | Ji et al. |
| 5,761,531 A | 6/1998 | Ohmura et al. |
| 5,765,030 A | 6/1998 | Nachenberg et al. |
| 5,826,013 A | 10/1998 | Nachenberg |
| 5,832,208 A | 11/1998 | Chen et al. |
| 5,959,976 A | 9/1999 | Kuo |
| 6,038,233 A | 3/2000 | Hamamoto et al. |
| 6,138,254 A | 10/2000 | Voshell |
| 6,154,879 A | 11/2000 | Pare, Jr. et al. |
| 6,223,172 B1 | 4/2001 | Hunter et al. |
| 6,266,337 B1 | 7/2001 | Marco |
| 6,279,113 B1 | 8/2001 | Vaidya |
| 6,311,273 B1 | 10/2001 | Helbig, Sr. et al. |
| 6,356,859 B1 | 3/2002 | Talbot et al. |
| 6,357,008 B1 | 3/2002 | Nachenberg |
| 6,389,419 B1 | 5/2002 | Wong et al. |
| 6,397,259 B1 | 5/2002 | Lincke et al. |
| 6,424,650 B1 | 7/2002 | Yang et al. |
| 6,430,184 B1 | 8/2002 | Robins et al. |
| 6,438,612 B1 | 8/2002 | Ylonen et al. |
| 6,519,264 B1 | 2/2003 | Carr et al. |
| 6,615,261 B1* | 9/2003 | Smørgrav ................ 709/224 |
| 6,662,230 B1 | 12/2003 | Eichstaedt et al. |
| 6,707,915 B1 | 3/2004 | Jobst et al. |

(Continued)

FOREIGN PATENT DOCUMENTS

WO WO 00/28420 5/2000

OTHER PUBLICATIONS

Office Action issued in U.S. Appl. No. 09/881,145 on Aug. 16, 2007.

(Continued)

*Primary Examiner* — John Pezzlo
(74) *Attorney, Agent, or Firm* — Ropes & Gray LLP

(57) ABSTRACT

Method for source-spoofed internet protocol packet traceback. This is an IP packet traceback technique for locating the origin of a malicious packet, even if the packet's IP source address is incorrect (spoofed). This is done by having routers lookup the source address in their routing tables, and mark the relevant entry.

35 Claims, 18 Drawing Sheets

U.S. PATENT DOCUMENTS

| | | | |
|---|---|---|---|
| 6,738,814 B1 | 5/2004 | Cox et al. | |
| 6,741,595 B2 | 5/2004 | Maher, III et al. | |
| 6,782,503 B1 | 8/2004 | Dawson | |
| 6,804,237 B1 | 10/2004 | Luo et al. | |
| 6,842,861 B1 | 1/2005 | Cox et al. | |
| 6,870,849 B1 | 3/2005 | Callon et al. | |
| 6,909,205 B2 | 6/2005 | Corcoran et al. | |
| 6,947,442 B1 | 9/2005 | Sato et al. | |
| 6,978,223 B2 | 12/2005 | Milliken | |
| 6,981,156 B1 | 12/2005 | Stern | |
| 6,981,158 B1 | 12/2005 | Sanchez et al. | |
| 7,921,462 B2 * | 4/2011 | Rooney et al. | 726/23 |
| 2002/0001384 A1 | 1/2002 | Buer et al. | |
| 2002/0071438 A1 | 6/2002 | Singh | |
| 2003/0061502 A1 | 3/2003 | Teblyashkin et al. | |
| 2003/0097439 A1 | 5/2003 | Strayer et al. | |
| 2003/0110393 A1 | 6/2003 | Brock et al. | |
| 2003/0145232 A1 | 7/2003 | Poletto et al. | |
| 2003/0167402 A1 | 9/2003 | Stolfo et al. | |
| 2003/0172289 A1 | 9/2003 | Soppera | |
| 2004/0093521 A1 * | 5/2004 | Hamadeh et al. | 713/201 |
| 2004/0103315 A1 | 5/2004 | Cooper et al. | |
| 2004/0213272 A1 * | 10/2004 | Nishi et al. | 370/401 |
| 2005/0014749 A1 | 1/2005 | Chen et al. | |
| 2005/0021846 A1 * | 1/2005 | Tzeng et al. | 709/238 |
| 2005/0058129 A1 | 3/2005 | Jones et al. | |
| 2005/0074015 A1 * | 4/2005 | Chari et al. | 370/400 |
| 2005/0132219 A1 * | 6/2005 | Robert | 713/201 |
| 2006/0010389 A1 * | 1/2006 | Rooney et al. | 715/736 |
| 2006/0137009 A1 * | 6/2006 | Chesla | 726/22 |
| 2006/0251085 A1 * | 11/2006 | Kalkunte et al. | 370/400 |
| 2008/0056278 A1 * | 3/2008 | Kadambi et al. | 370/395.53 |

OTHER PUBLICATIONS

A Plan for Spam, http://www.paulgraham.com/spam.html (2002).

Braden, R., "Requirements for Internet Hosts—Application and Support," Internet Engineering Task Force, (1989).

Crocker, D., "Standard for the Format of ARPA Internet Text Messages," Department of Electrical Engineering, University of Delaware, Newark, DE, pp. 1-49, (1982).

Distributed Checksum Clearinghouse (DCC) http://www.rhyolite.com/antispam/dcc/dcc-tree/dcc.html (Aug. 26, 2002).

Freed, N., "MIME Parameter Value and Encoded Word Extensions: Character Sets, Languages, and Continuation," The Internet Society, pp. 1-10 (1997).

Freed, N., "Multipurpose Internet Mail Extensions (MIME) Part Five: Conformance Criteria and Example," Standards Track, (1996).

Freed, N., "Multipurpose Internet Mail Extensions (MIME) Part Four: Registration Procedures," Best Current Practice, (1996).

Freed, N., "Multipurpose Internet Mail Extensions (MIME) Part One: Format of Internet Message Bodies," Standards Track, (1996).

Freed, N., "Multipurpose Internet Mail Extensions (MIME) Part Two: Media Types," Standards Track, (1996).

Heberlein, T. "Worm Detection and Prevention: Concept, Approach, and Experience;" Net Squared, Inc.; http://www.attackcenter.com/information/whitepapers/wormdetect/: pp. 1-7, (2002).

Moore, K., "Multipurpose Internet Mail Extensions (MIME) Part Three: Message Header Extension for Non-ASCII Text," Standards Track, (1996).

Savage et al., "Practical Network Support for IP Traceback," Department of Computer Science and Engineering, University of Washington, (2000).

Schwartz et al., "Smart Packets: Applying Active Networks to Network Management," ACM Transactions on Computer Systems, 18(1):67-88, (2000).

Skipper, Chad, "Polymorphism and IDS," Symantec, (2001).

Staniford-Chen et al., "Holding Intruders Accountable on the Internet," Department of Computer Science, University of California at Davis, Davis, CA, pp. 39-49, (1995).

* cited by examiner

|  SUBNET PREFIX | USE |
| --- | --- |
|  | |
|  | |
|  | |
|  | |
|  | |
|  | |

FIG. 2

METHOD FOR SOURCE-SPOOFED IP PACKET TRACEBACK

CROSS REFERENCE TO RELATED APPLICATIONS

This application claims priority under 35 U.S.C. §119(e) to U.S. Provisional Application No. 60/652,932 titled "METHOD FOR SOURCE-SPOOFED IP PACKET TRACEBACK" filed Feb. 15, 2005, the entirety of which is hereby incorporated by reference.

FIELD OF THE INVENTION

The systems and methods described herein relate generally to a method for source-spoofed data packet traceback. More particularly, they relate to methods for tracing the network origin of a data packet sent over the data network.

BACKGROUND

The pervasiveness of the Internet makes it an attractive target to people with malicious intent. Also, the design of the Internet makes it quite easy to obscure the origin of a packet, despite the presence of a source IP address in every packet, since the routers in the Internet rarely, if ever, do anything to ensure or check that the source IP address is the actual origin of a packet. Thus, many attacks use "spoofed" IP source addresses, to obscure the actual origin of the attack.

Some routers do offer a means to ensure that the source address of a packet corresponds to the subnet attached to the interface the packet arrived on ("source address filtering"), but this feature requires careful configuration, and can only be used when the interface is connected to a single subnet at the edge of the Internet. The design of the Internet makes it virtually impossible to implement such a feature in routers in the core of the network, or at borders between different service providers. Thus, the feature is not often used, and is in any case insufficient to guarantee the validity of IP source addresses in packets.

Also, Internet routers keep no records of individual packets, or even TCP connections, so there is little forensic evidence left in routers from an attack.

For attacks which involve TCP connections, or other protocols involving the exchange of several packets between the endpoints, it is difficult for the IP source address to be spoofed, since packets must flow back to the origin, to execute the protocol correctly. Thus, TCP-based attacks generally involve the compromise of intermediate systems (often referred to as "zombies" or "steppingstones"), and the location of the intermediate system can be correctly extracted from the source IP address. However, there are attacks on the TCP protocol implementation itself, or on existing connections, which employ spoofed source address packets, since the reply packets are not required to be correctly routed to achieve the attacker's goal.

There are also connectionless attacks, in which the attacker activates a previously compromised system using one or more packets which contain spoofed IP source addresses. (While the attack itself is connectionless, the attacker's control packets may have the appearance of TCP or another connection-oriented protocol, without the protocol itself being used.)

Some worms, such as the "SQL Slammer" or "Sapphire" worm, also use connectionless direct attacks employing spoofed IP source addresses. The SQL Slammer worm is an example of the worst case—an attack that is completely contained in a single packet with a spoofed source address.

Most work to date on IP traceback has focused on tracing packet streams back to their origin. This usually necessitates both cooperation on the part of the Internet infrastructure (including the addition of new features to routers), and a sufficient number of packets to allow some kind of step-by-step backtracking, while the attack is still taking place. Unfortunately, adding novel features to existing routers is not always feasible, and many known attacks do not include a sufficiently-long stream of attack packets for many proposed traceback methods to work properly.

One known method, the Source Path Isolation Engine (SPIE), developed earlier by BBN of Cambridge Mass., is capable of tracing a single packet to its origin point. Although this system works quite well, it does require upgrades to some of the routers along the attack path before it can produce results. These upgrades require the addition of high speed logic and memory to the router interface, or the installation of external monitoring devices on the interfaces of most routers. In addition, SPIE keeps a record of packets seen in backbone routers for up to ten minutes or so, making it useful primarily when trigged by automated defense systems. And such systems often miss novel attacks.

Thus, it is desirable to find a new means of tracing back individual packets with spoofed source IP addresses, without requiring substantial hardware changes to existing routers, and with the ability to trace packets of interest hours or days after they transited the network.

SUMMARY OF THE INVENTION

The systems and methods described herein include, among other things, a spoofed IP packet traceback method and mechanism that makes use of data structures and address lookup mechanisms normally present in IP routers, but with slight modifications, and it slightly expands the existing data structures in a novel way. It also makes use of three observations:

Only packets with spoofed source addresses really need a new traceback mechanism (since a non-spoofed source address can be checked against registry databases and other sources);

It is not really the attack packet that is of interest, but rather, where it came from; and There is normally only a single active route for packets from a particular source subnet to a particular destination subnet.

These observations relate to aspects of IP routing. Thus, the systems and methods described herein exploit existing routing tables to remember spoofed packets.

In particular, to support this method, routers perform a source lookup on all arriving packets, using the same tables normally used for destination lookup. In addition, the routing prefix entry found in the forwarding is then marked as "used".

The "used" bits are periodically recorded with a timestamp, and reset to zero. The corresponding route prefix is also to be associated with the "used" bits; how this is done may vary with the lookup algorithm and data structures used.

When a packet with a spoofed source address is to be traced, these "source prefix used" records for the routers nearest the destination are examined to see if any packets were seen with a source address prefix matching that of the packet being traced. The arrival interface is identified, and then the process repeats with all neighboring routers associated with the arrival interface.

The backtracing process will either lead to a single origin subnet, or multiple origin subnets for traffic sharing the source prefix of the packet being traced. If only one source is found, that is the subnet of origin of the packet. If multiple potential origins are found, then routing data is examined to determine if any of the origin subnets is actually assigned the source prefix. If so, the other subnets found are sources of spoofed IP traffic, and one of them is the attack packet origin. In general, if there is more than one source of spoofed traffic, all of them are likely to be related to the attack. In addition to routing data, Internet address assignment registries may be used to check which is the legitimate source of that address, and which is not.

Analysis of the used-routing-entry flags in many routers, in conjunction with knowledge of the network topology and the network routing state, can also be used to discover attacks (by detecting address spoofing that might otherwise have gone undetected), and to assist in various network traffic engineering activities.

More particularly, the systems and methods described herein include, in one aspect, a method for tracing source spoofed network communications on a network comprising providing a plurality of sub-blocks of source addresses corresponding to a block of addresses on the network capable of sending a network communication and a plurality of use bits associated with respective ones of the plurality of sub-blocks of source addresses. When a network communication arrives, the methods described herein modify the use bit corresponding to at least one sub-block of source address associated with the network communication. The method may analyze the use bits to trace the source of a spoofed network communication being forwarded over the network.

Optionally, the method compiles a partial list of use bits at specified time intervals, and may reset the use bits at specified time intervals.

The method may perform the compilation by either a network operations center or a third party agent and collecting the use bits responsive to an investigation command issued from an NOC, a traceback agent, or some other system component.

The method may also include modifying a look-up table of a router on a network to associate the plurality of use bits with a plurality of source addresses in the look up table. The method may collect usebits having a second binary value and may iteratively query use bits of one or more nearest neighbor routers until a source subnet is traced for the network communication.

The analysis may involve polling a neighbor nearest a router to determine if the neighbor has forwarded a network communication exhibiting a spoofed sub-block of addresses. Analyzing the tracing may also include iterating the query, if the neighbor has forwarded a network communication exhibiting the spoofed sub-block of addresses, by polling the neighbor's neighbors. To this end, the method may use network routing and topology data to trace the source of a spoofed network communication and identify an attack path In certain practices the method collects data from a subset of nodes of an attack path, and records an interface from which the network communication is received.

The sub-block of addresses may comprise all address bits and the method may employ or apply a hashing function or Bloom filter to the address bits for the purpose of tracking used source addresses. In addition to tracing sources, the method may detect routing errors based on, at least in part, the use bits, determine routing related SLA violations based on, at least in part, the use bits, periodically compile use bits to detect unexpected network communications and determine network traffic patterns and network connectivity between two or more network nodes. Optionally, the method may substitute an internet protocol destination look-up table disposed in the first router with the first look-up table.

In another aspect, the invention provides a system for tracing a source spoofed network communication. The system may include a table having a plurality of sub-blocks of source addresses corresponding to a block of addresses on the network capable of sending a network communication, and a plurality of use bits associated with respective ones of the plurality of sub-blocks of source addresses, a look up process for, when a network communication arrives, modifying the use bit corresponding to at least an sub-block of source addressed associated with the network communication. Additionally, the system includes a traceback agent for analyzing the use of bits to trace the source of a spoofed network communication being forwarded over the network.

BRIEF DESCRIPTION OF THE DRAWINGS

The present disclosure may be better understood and its numerous features and advantages made apparent to those skilled in the art by referencing the accompanying drawings.

FIG. 2 is an example of a routing or lookup table;

DETAILED DESCRIPTION

The systems and methods described herein include, among other things, systems and methods that allow for a network communication that has a spoofed network address to be traced back to the actual source of origin. To this end, nefarious IP packets having a spoofed source addresses can be traced back to the actual sender on the internet. The systems and methods described herein also provide systems and methods for identifying data paths through a network, as well as identifying routing errors and service level agreement (SLA) violations. These and other systems and applications are provided by the systems and methods described herein. For purpose of clarity, the systems and methods will be described with reference to an embodiment of the invention that allows a network communication such as a data packet to be traced back through the network. However, the embodiments discussed below are only provided for purpose of illustration and are not to be deemed limiting in anyway.

In general, existing routers can be used to record evidence of the passage of packets with a source address in a specific range; the actual source addresses themselves are not normally recorded though they may be in alternate optional embodiments such as an embodiment supporting Ethernet networks.

When nefarious packets are detected on a network, a query may be sent to the routers. The query may begin at or around the surrounding node of the victim node. The query comprises a question of whether a packet with the spoofed address has been forwarded through the routers. An affirmative response results in an iterative query to one or more of the nodes surrounding the router which has returned the affirmed response. Information received from one or more routers can be used to determine the actual source of the nefarious packet.

In another optional embodiment, information from modified routing tables are periodically sent to one or more network operation centers (NOC's). Tables are modified in the following manner. Routing tables which normally record destination routing information are utilized to record source address information. Information pertaining to the source address of forwarded packets is sent to NOC's.

Information received by the NOC's can then be compiled in a central location for analysis. Knowing network topology as well as the network routing state, a user or agent can determine the actual source of nefarious packets even if information is unavailable from all network routers.

In yet another embodiment, third party agents are used to collect or transmit source address information. Third party agents can either be software executed on network routers or firmware executed on hardware which is piggy-backed on nodes or links of a network.

Figure 1:
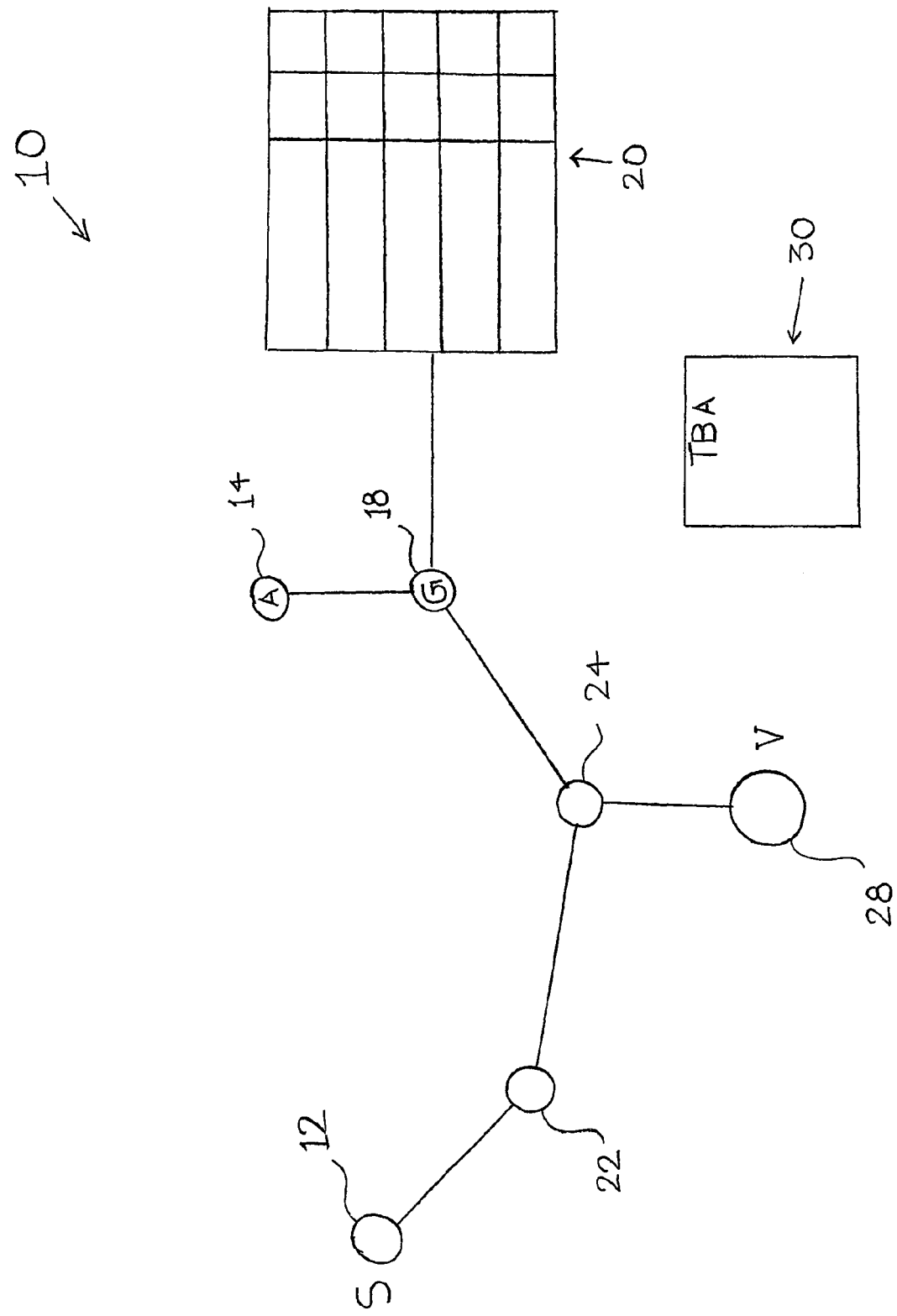
FIG. 1 is an illustration of a source-rooted forwarding tree for S.

Turning to FIG. 1, one embodiment of the systems and methods described herein is depicted. More particularly, FIG. 1 depicts a network 10 that includes a source node 12, and attack node 14, a relay node 18, a lookup table 20, relay nodes 22 and 24 and a victim node 28. Also shown in FIG. 1 is a trace back router 30.

The Network 10 depicted in FIG. 1 is largely configured like a conventional computer network system of the type commonly used for forwarding data between locations. In this embodiment, each of the nodes shown in FIG. 1 and on Network 10 have been modified to provide for recording information to be used by trace back router 30 for determining the origin of a network communication, typically for an IP network and/or an IP data packet, that has a spoofed source address. As discussed above, a data packet traveling across a network such as an IP network will have within it information representative of the source of that data packet.

As is known in the art, the data packet format for a data packet traveling on an IP network includes a source field that has an IP address indicating the sub-net that originated the data packet. In some attacks on a network, a spoofed IP source address is inserted into the data packet and is transmitted from a subnet different from the subnet identified in the source field of the IP data packet. In the Network 10 depicted in FIG. 1 the node 14 is an attack node that is forwarding to the victim node 28 data packets that have a spoofed source field indicting their origin as the source node 12. The data packets forwarded to the victim node 28 may be malicious packets that interfere with the operation of the node 28 or perform unauthorized copying of information stored at that node or perform some other nefarious act. In any case, the victim node 28 receives the data packets and at one point it is determined that a data packet sent to the victim node 28 needs to be traced back to its origin to determine the compromised node on the Network 10 that is generating these attack packets. The actual technique employed for detecting the malicious packet at V node 28 will depend upon the type of attack and any of the techniques known in the art, including any of the conventional forensic techniques may be employed. Further, the systems and methods described herein allow for tracing back multiple packets, or other network communications, so the user may select several candidate network communications for traceback, including for example, a block of data packets, whether IP, ethernet or some other format, that arrived about a certain time may be traceback. Other techniques for identifying a communication to traceback may be employed without departing from the scope of the invention.

To this end, the Network 10 includes a set of routers that have been modified to generate a lookup table such as the lookup table 20 depicted in FIG. 1. The lookup tables store information representative of those subnets that have sent data packets into that node. The information collected in the lookup table may be subsequently used by the trace back router 30 for the purposes of identifying the origin, the actual origin, of the attack packet sent to node 28.

Figure 2:
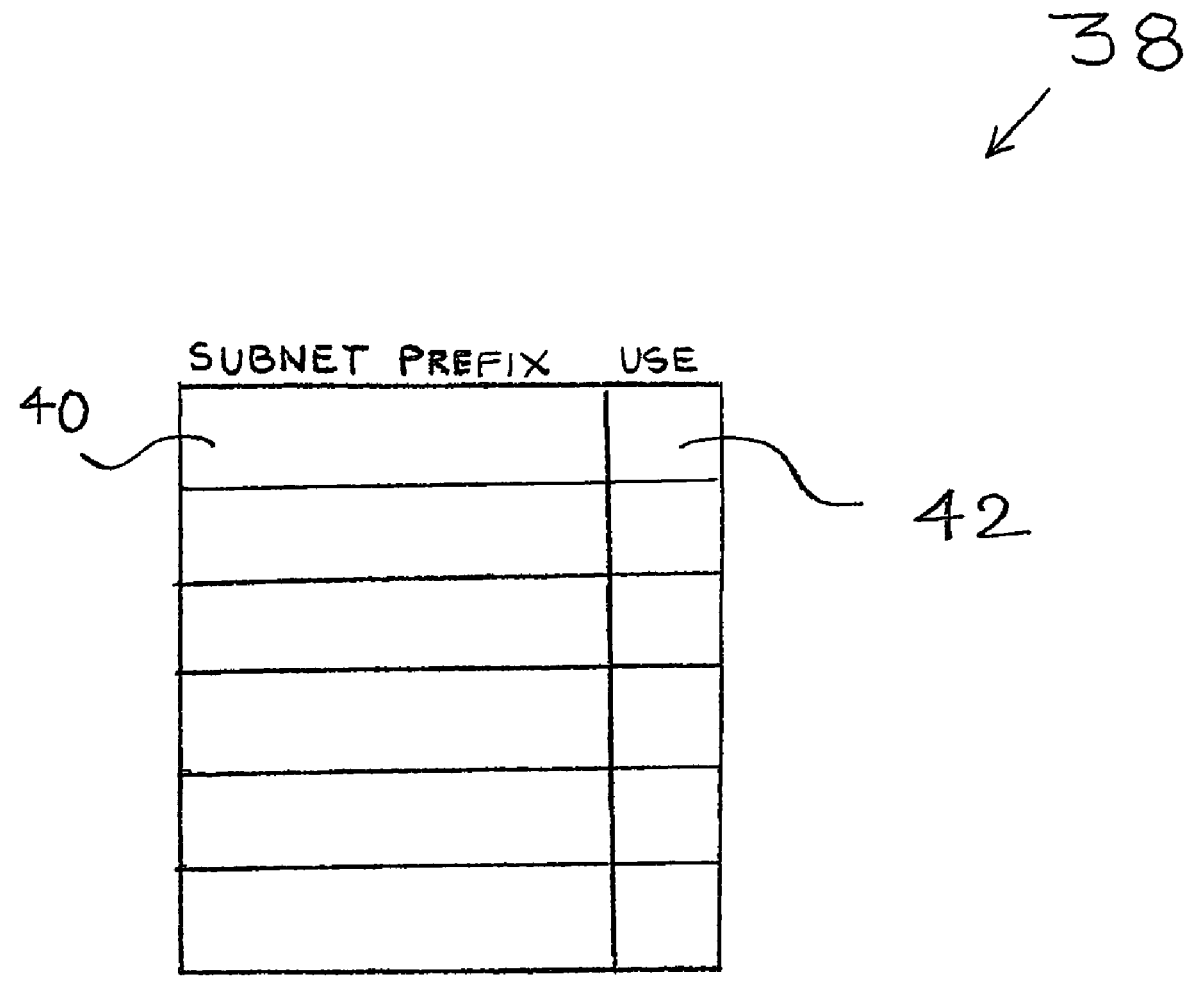

FIG. 2 depicts in more detail one example of a lookup table of the type that can be employed with the Network 10 depicted in FIG. 1. More particularly, FIG. 2 depicts a lookup table 38 that includes a series of fields that include subnet field 40 and use field 42. Subnet field 40 is comprised of a column of IP prefixes which correspond to a particular subnet on a network. Use bits 42 is a column of binary values that correspond to respective subnet prefixes.

In one practice, the lookup table 20 is populated in the following manner in accordance with FIG. 2. Upon arrival of a network communication, which for this embodiment will be an IP packet, the IP address, or in an optional embodiment the subnet prefix 40 is copied from the IP packet header and then applied to the lookup table 20. Upon application of the subnet prefix to the lookup table 20. Page: 11
Typically the value looked up in the table is normally the entire IP address, using the normal IP forwarding lookup algorithm known as "longest match first". When "flat" tables are used, fixed number of prefix bits are used, but in the general case, all the bits are looked up. The table entries contain prefix entries, which include the length of the prefix, and this is used in the matching process to compare the entries correctly to the IP address being looked up. This algorithm is well-known, and is used, in some form, by most IP routers.

In either case, upon application of the copied address data, to the lookup table 20, a determination is made as to whether an entry of the same subnet prefix is contained within the lookup table 20. If the subnet prefix of the incoming packet is found within the lookup table 20 then the use bit is set, populating the bit field 42 with the binary number 1. If it is determined that the subnet prefix of the incoming IP packet is not found within the lookup table 20, then a binary 1 is set or written into a default entry field (prefix of zero length) provided within the lookup table 20. If the routing table lacks a default entry, one special entry may be added for use by the traceback process for when the lookup match fails, and the associated use bit would be set on this entry. Normally this would indicate use of an unroutable (unassigned) or illegal IP address. Of course, with some embodiments of the methods described herein, such as one that uses a simple table indexed by a fixed number of upper address bits, there is always a usable table entry, and thus there would be no default entry or lookup failure.

The lookup operation and the lookup tables described herein may be derived from conventional lookup operations and from conventional tables such as those known to ones of skill in the art of network engineering, and such as those described in, among other places, Halabi, Internet Routing Architectures, Cisco Press (1997), the contents of which are incorporated by reference herein.

Figure 3:
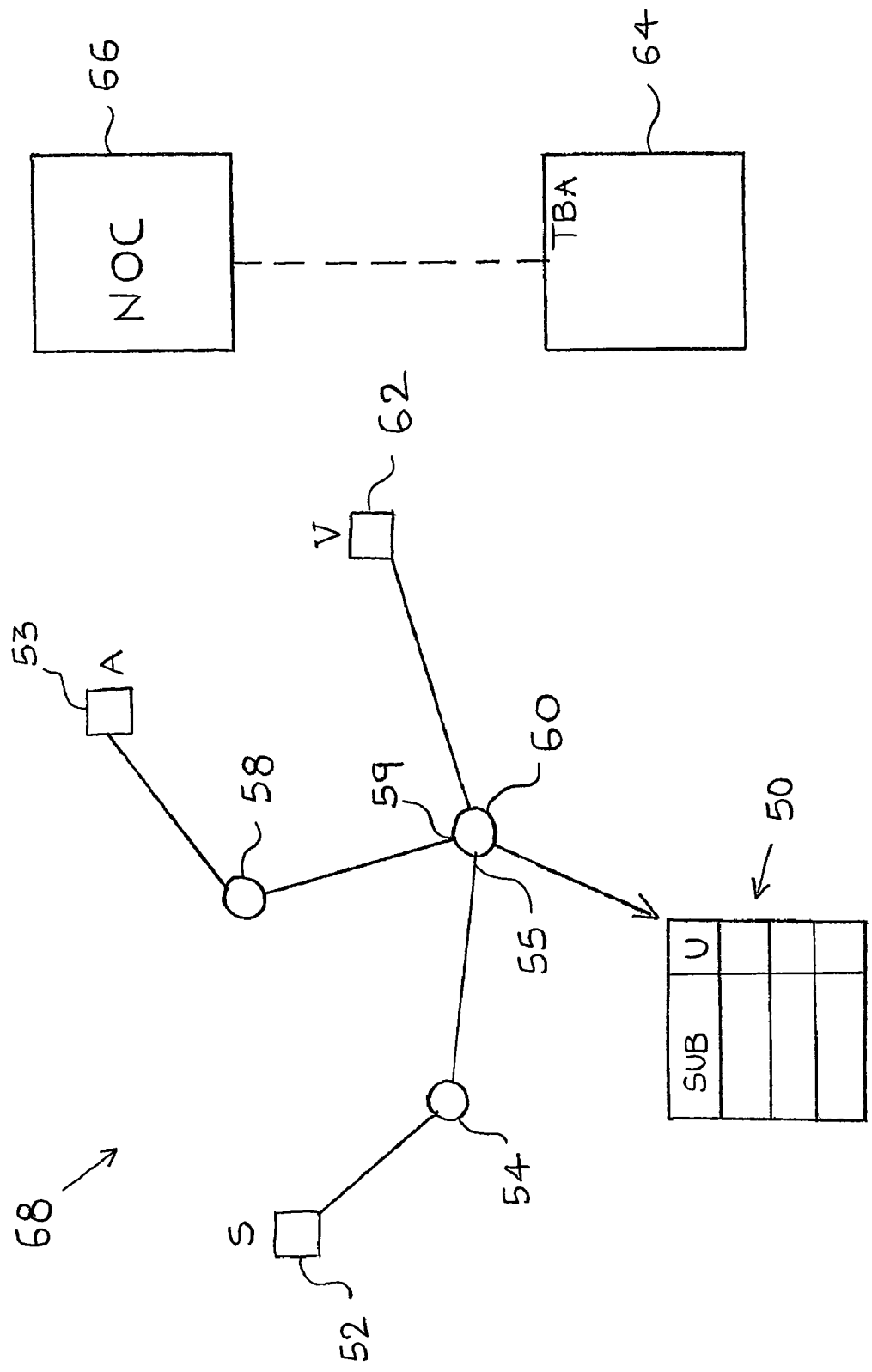
FIG. 3 is an illustration of a network with an optional network operations control.

FIG. 3 depicts two embodiments of the present invention. FIG. 3 illustrates network 68, optional network operations center 66, and traceback agent 64. Network 68 comprises, attacker 53, network node 58, source 52, network node 54, network node 60, and victim 62. In the present embodiments, attacker 53 sends a source spoofed packet to victim 62. The source spoofed packet is sent from the actual address of attacker 53 but contains information in the packet header indicating that the source spoofed packet was sent from source 52. The source spoofed packet travels from attacker 53 to victim 62 through network node 58 and network node 60.

Upon receipt of the spoofed source packet, network node 60 accesses routing table 50 to record the event. Routing table 50 can be a modified routing table similar to the routing tables normally found in a router or switch, but modified to include a use bit field as described above. Routing table 50 comprises a column listing a sub-block of address space (e.g., subnet for IP networks) and a column of associated use bits for each of the rows. Network node 60 locates the entry (if available) associated with spoofed source packet by performing a lookup on the column of sub-block of addresses. As is well known in the art, the lookup table algorithm can be a longest prefix match algorithm. Upon location of the matching address, network node 60 sets the use bit of the table entry to a value (e.g., binary "1") known to indicate that a packet has been forwarded by the network node 52. Node 60 indicates that the spoofed address entered on the link from the node which might be the actual origin of the packet, in general. In the depicted example, it is the upstream router on the path from the actual spoofer Node 60 will have no direct knowledge of the spoofer, in this case, but would point the tracing process at the upstream router, which does have direct knowledge about the spoofer.

In a first embodiment in accordance with FIG. 3, traceback agent 64 commences a query based on the detection of an attack, such as in a denial of service attack. In the present embodiment, traceback agent 64 collects and compiles investigative data to the determine the origin of the attack. Traceback agent 64 begins by asking the surrounding nodes of victim 62, if the surrounding node had passed the packet. In simple example, this query would only be directed to network node 60. When queried, network node 60 executes a read lookup on the spoofed source address in the sub-block of address space. Network node 60 returns a value indicative of whether the spoofed source packet had been passed.

Traceback agent 64 subsequently requests information about network node 60's nearest neighbors, if network node 60 returns a value indicating that the spoofed source packet had been passed. The nearest neighbor information received by the traceback agent 64 is used for iterative querying of other neighbor nodes. The traceback agent 64 may be realized as a software component operating on a data processing platform having a network interface or a direct interface with a router. In some embodiments the traceback agent may be integrated into one or more of the routers in the network. Thus, although the traceback element is depicted as a separate network component, this is merely done for purpose of illustration and the actual implementation of the traceback router may be as a component of a router, node or other network element. Further, the traceback element may be housed at the NOC. The actual implementation of the traceback agent will vary with the network architecture and the implementation of the network design engineer.

Thus, for the network 68 in FIG. 3 the traceback agent 64 performs similar queries on network node 60's nearest neighbors. For example, traceback agent 64 queries network node 54 and network node 58. In this example, network node 54 would deny sending a packet containing the spoofed source address and network node 58 would confirm sending a packet with the spoofed address. Conclusive determination results when network node 58 affirms passage of the spoofed source packet. In the depicted embodiment, traceback agent 64 is tasked with the collection of network information used map out the source tree of the network. Traceback agent 64 can either perform the deterministic data analysis itself or, alternatively, pass the information on to another agent to perform the analysis, or take part in some other analysis process where for example 6, some of the analysis is done by the traceback agent 64 and some by the NOC or another processor In an alternate embodiment, the routing table information is periodically sent to the network operations center (NOC) 66 where the use bit data is collected and analyzed. Specifically, routing table information from network node 60, network node 54, source 52, network node 58, and victim 62 is sent to NOC 66.

In the present embodiment, the traceback agent 64 receives the routing table information and performs an analysis of the contents contained therein to determine the source of the attack. In particular, traceback agent 64 uses the information received from the NOC 66 to map out the network topology. Techniques and tools for mapping network topology are known in the art and any suitable techniqued or tool may be used. In the event that a bonafide packet had been sent from source 52 and a spoofed source packet from network node 58, traceback agent 64 can determine which packet route is authentic and which packet is nefarious. The determination is based on, at least in part, the mapped network topology. For example, traceback agent 64 determines that packets exhibiting the source address (i.e., the spoofed source address) forwarded on network node 58 are improper because the subnet of network node 58 does not correspond to the spoofed source address subnet.

Furthermore, traceback agent 64 can exclude packets traveling through network node 54 as properly sent due to the likelihood that the packets were actually sent by source 52. This exclusion can be based on probability (expectation) derived from routing information received from NOC 66 over a protracted period of time. Alternatively, the exclusion can be based on sub-block address information (e.g., subnet) being matched up with the network topology map. Other techniques for determining authentic paths through network 68 may be employed, and the technique used will depend upon the particular application and situation being addressed by the network engineers.

The second embodiment described here includes a timestamp with the data. This timestamp would typically indicate the period over which the data was collected (such as a specific 15-minute interval of a single day). It is used primarily for historical tracebacks when an attack packet needs to be traced hours or days after the actual attack, and is used to determine which set of "use" bits should be queried in an archive at the NOC corresponding to the time period of the attack.

In one or more embodiments, network node 60 has a plurality of network interfaces (e.g., line cards) 55, 59. Network interfaces can be used to record the source path of an incoming packet into network node 60. For example, a packet traveling from network node 54 to victim 62 is processed by interface 59. Network node 60 can record this information in the routing table 50. This provides information about the network link over which a packet traveled.

Figure 4:
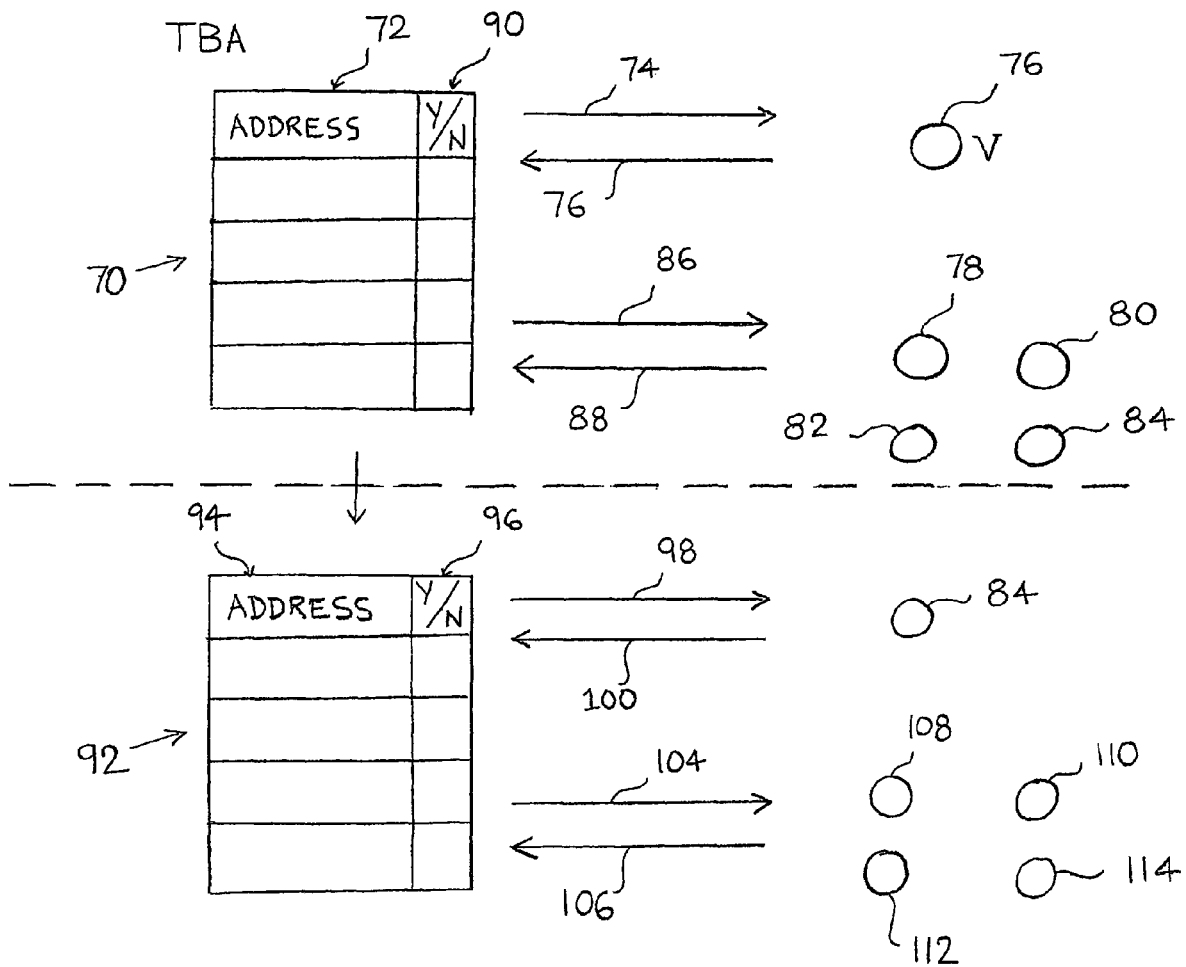
FIG. 4 is an example of an iterative queries process using tables.

Turning to FIG. 4, FIG. 4 shows the query process in accordance with one or more embodiments of the present invention. In the example depicted in FIG. 4, a traceback agent commences an investigation by querying victim 76, presumably after attack has been detected. First query 74 requests from victim 76 information relating to its nearest neighbors. Response 76 is sent from victim 76 to the traceback agent listing its nearest neighbors. The traceback agent inputs the response into table 70. Specifically, traceback agent populates address column 72 with information contained in response 76.

The traceback agent subsequently uses information contained in address column 72 to query victim 76's nearest neighbors nodes 78, 80, 82, and 84. Query 86 requests confirmation or denial relating to the forwarding of a packet exhibiting the spoofed source address. Response 88 indicates a binary response to the query which the traceback agent uses to populate y/n column 90. In the present example, nodes 78, 80, and 82 deny forwarding the specified packet and node 80 confirms a forwarding of a packet exhibiting the spoofed source address.

The traceback agent iterates the query by sending query 98 requesting information relating to node 84's nearest neighbors. Address information contained in response 100 is used to populate address column 94 within table 92. Address column 94 includes information relating to node 84's nearest neighbor nodes 108, 110, 112, and 114. Query 104 requests confirmation or denial relating to the forwarding of a packet exhibiting the spoofed source address. Response 106 indicates a binary response to the query which traceback agent uses to populate y/n column 96.

Iteration of the query continues until the location in the network topology of the node sending spoofed source address packet is determined—such as the port of the first switch on the attack path that recorded the packet source address. In some cases, the traceback process will only identify the LAN the attacker is on (if the LAN uses only hubs, or switches which do not record the source path information). Other more conventional investigative methods would then be used to identify the actual attacker host. Typically this involves getting the cooperation of the LAN owner and physically or remotely examining all the machines on the LAN for evidence of the attacker's code.

In another embodiment, the tables 70, 92 are derived directly from routing information sent from one or more network operation centers (not shown), and the query process populates the y/n column 96 as described with reference to FIG. 4.

The systems and methods described with reference to FIGS. 1-4 address one of the key problems in tracing malicious packets in the Internet which is the difficulty of locating the actual originating machine, since IP source addresses can be spoofed without much chance of detection. This problem becomes much more difficult when there is only a single malicious packet to trace (which is a common case, and will become more common if it successfully evades traceback techniques). An example of a malicious attack employing only a single, source-spoofed packet, was the "SQL Slammer" worm of January 2003. FIGS. 5-18, illustrate the use of the systems and methods described herein to locate the machine that originated a malicious packet.

For the systems and methods described herein, the "origin" or "attacking node" is the source of the malicious packet; it may not be—and usually is not—the true origin of the attack, but an intermediate node compromised by the attacker (a.k.a. "zombie," "relay," or "steppingstone."). However, backtracking the attacker generally requires locating the origin of the malicious packet first; then other techniques, such as forensic analysis of the originating machine, can be employed to attempt to follow the trail back to the true origin of the attack.

In the following discussion and diagrams, there are four hosts of interest: Victim 120 is the "victim" host, the destination address of the malicious packet being traced; Attacking node 130 is the "attacking node", the machine which created and sent the malicious packet into the Internet; Source 140 is the purported origin of the malicious packet, the IP source address used in the packet actually sent by Attacking node 130; and Destination 150 is some destination host which the real host Source 140 has sent packets to around the time of the attack.

Figure 5:
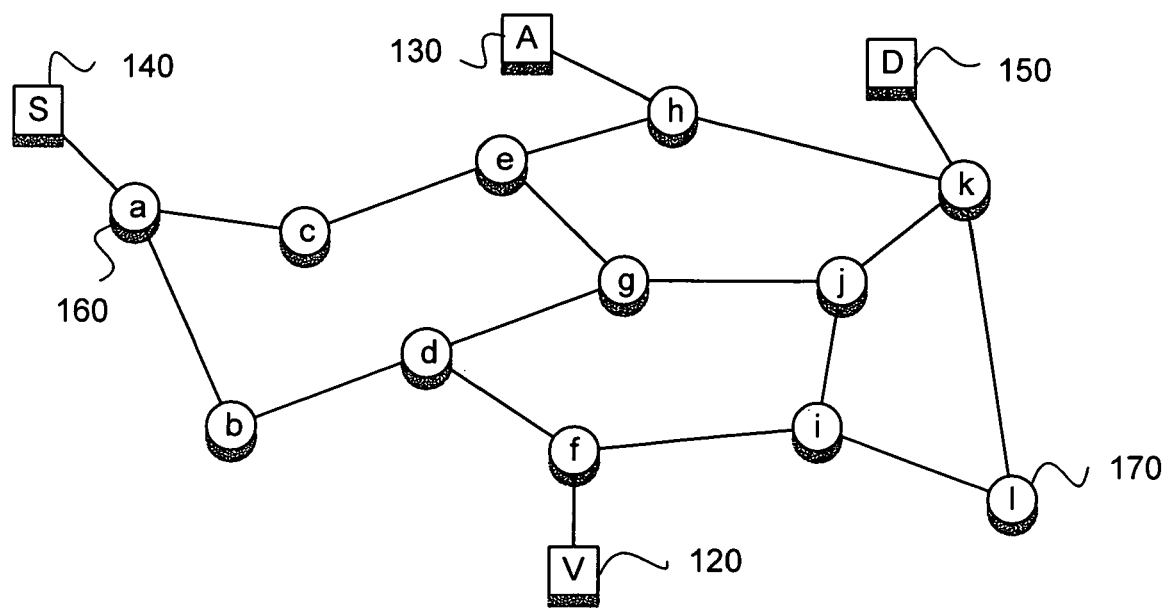
FIG. 5 is an illustration representing an example network according to the invention.

FIG. 5 shows a simple example network, with one of each of the entities described above, as well as routers labeled router 160 *a* through 160*l*. The nodes, hosts and routers depicted in FIG. 5, as well as in the other figures may comprise nodes, hosts and routers of the type commonly employed in a network, with modifications made as described herein. As also noted, the network may be an IP network, ethernet or some other network that transmits network communications from one point to another.

Of the above entities, only Attacking node 130 and Victim 120 must exist. We will also assume that some set of routers separate Attacking node 130 from V, or the traceback problem becomes relatively trivial.

The address of S may, for example, be illegal or unassigned, and so no actual traffic from the real S will exist. Likewise, the subnet to which S would belong may also be a real subnet, or one which does not currently exist. If S, or its subnet, exists, then there may be legitimate traffic from that subnet to one or more hosts D elsewhere in the Internet.

There may be multiple attackers, which may send similar packets with the same spoofed source address S. A single node, Attacking node 130, is presented in the following examples and discussion, but the techniques described herein will deal correctly with multiple Attacking nodes using the same spoofed address S (or using other addresses from S's subnet).

The following examples and discussions assume that source S 140 is a real host, and there exists traffic from source S 140 to one or more destination hosts D elsewhere in the Internet. This is understood as the most difficult case. If S 140 or its subnet do not exist, there is no conflicting evidence of real traffic from S's subnet to deal with. Likewise, if S has not sent recent traffic in the network to at least one destination D, there is again no conflicting evidence about the path of S 140 due to legitimate traffic. The following examples use a single legitimate traffic destination D for clarity, but the same processes apply when S or its subnet originate legitimate traffic to multiple destinations D.

The Source-Rooted Forwarding Tree

Figure 6:
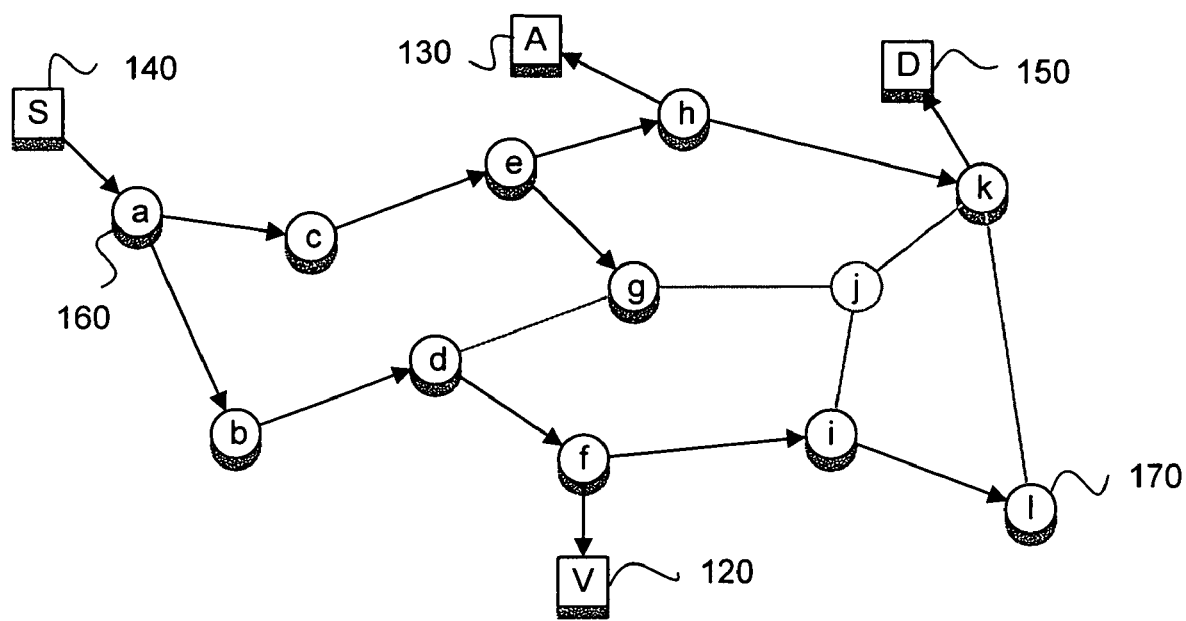
FIG. 6 is an illustration of a source-rooted forwarding tree for S.

The traceback methods described here may be understood in the context of a source-rooted forwarding tree for the source host S 140. This tree is a directed, acyclic graph implicit in the forwarding tables, collectively, of all the routing nodes in the network, and it describes the paths taken by packets originated at S 140 to all possible destinations D in the network. FIG. 6 shows using directed arrows, the source-rooted tree for S 140 in the example network from FIG. 5. Note that not all links or routers in the network are necessarily part of the source-rooted tree. Most well-designed networks have a sufficiently rich topology to allow the network to continue operating if one or more links or routers fail. Only those links and routers which are required to reach every possible destination network are part of the tree.

Thus, in the example network of FIG. 5, the links between routers 160 *d* and 166 *g*, and 160 *k* and 160 *l* are not part of the tree, nor is router 160 *j* or any of the links attached to it. Typically such a router would be employed as a backup router for router diversity, or it might be a backbone router with no directly attached subnets which happened not to be on the best path for any packets originated at S 140.

The tree is implicit in the collective routing and forwarding tables of the network, since, for a packet with a given source S and destination D, the forwarding tables identify exactly one egress link to use for the packet to move it toward the destination. This is complicated somewhat by routing transients and multi-path routing techniques used for load-splitting, but the traceback technique described here will still work in the presence of routing transients or multi-path routes. However, the discussion here is limited to the simple case of stable routing over the period of interest, and no multi-path routes. The actual source tree is not constructed or used by the traceback method, but the method employs such a source tree existing implicitly.

Tracing a Packet Using Source Recording

The following describes the traceback mechanism and the tracing process in more detail. Two examples based on the example network of FIG. 5 are used. These represent different routing states of the same network and host topology, to describe the behavior of the traceback process in different situations. These examples are not exhaustive, but exemplify the fundamental non-trivial cases the traceback process might encounter.

In the example diagrams, solid arrows represent the path of legitimate traffic from S node 140 to D node 150, dashed arrows represent the actual path of the attack packet from Attacking node 130 to V, and dotted arrows represent the path the attack packet should have taken from S node 140 to V node 140, if the packet had actually originated at S node 140 instead of at V node 120.

Figure 7:
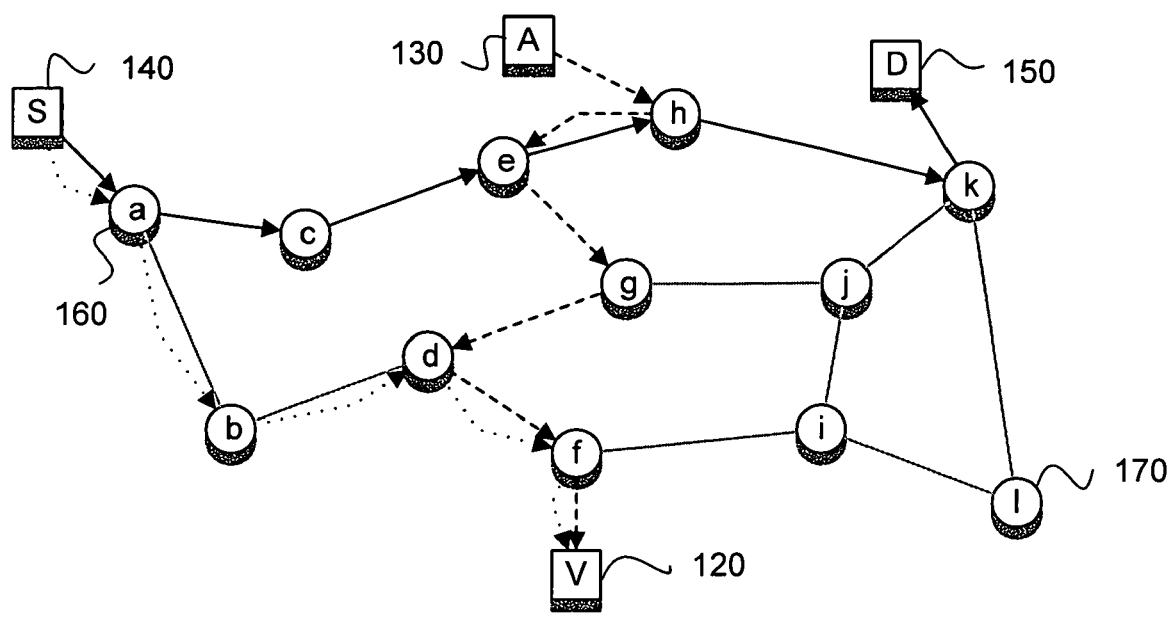
FIG. 7 is an example of a network attack path (spoofing source S) crossing the path of normal traffic from the actual source S, with a shared router.

In FIG. 7, the path of the attack packet crosses the path of some legitimate traffic from S node 140 to some destination D node 150, but the attack packets and the legitimate traffic do not traverse any link in common, only sharing the router 160 *e*, but arriving at and leaving 160 *e* via disjoint interfaces.

Figure 8:
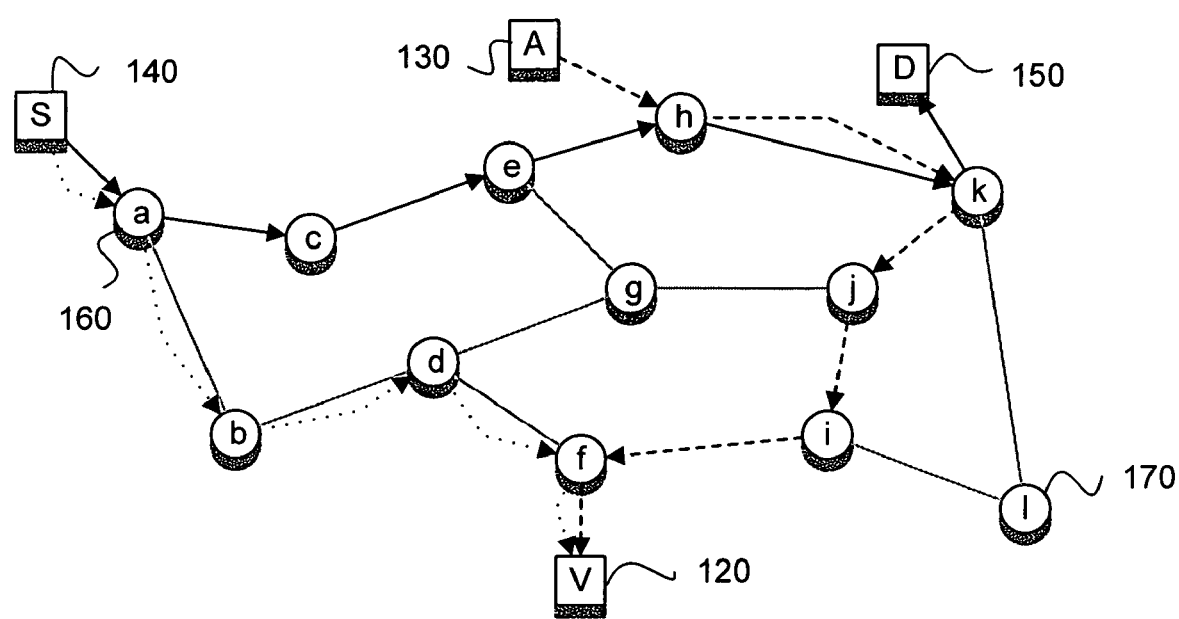
FIG. 8 is an illustration of an attack path and the normal traffic from S actually share a path segment (link).

The example in FIG. 8 illustrates the case where the attack packet traverses some link which also carries legitimate traffic from the purported source S Node 140 to some destination D Node 150. In this case, the attack packet and the legitimate traffic both pass through routers 160 *h* and 160 *k*, and share link 160 *h-k*. Not shown or discussed are the simpler cases where there is no legitimate traffic in the network from Node S's subnet, since the traceback process will be seen to be straightforward in that case.

Marking Source Paths

For each packet arriving on an interface, the IP source address field is looked up in the routing table, and a use bit in the forwarding table entry is set indicating that a packet from that prefix was received by the router on that ingress interface. If the router has multiple interfaces, each interface may have a corresponding "use" bit for each routing entry.

Figure 9:
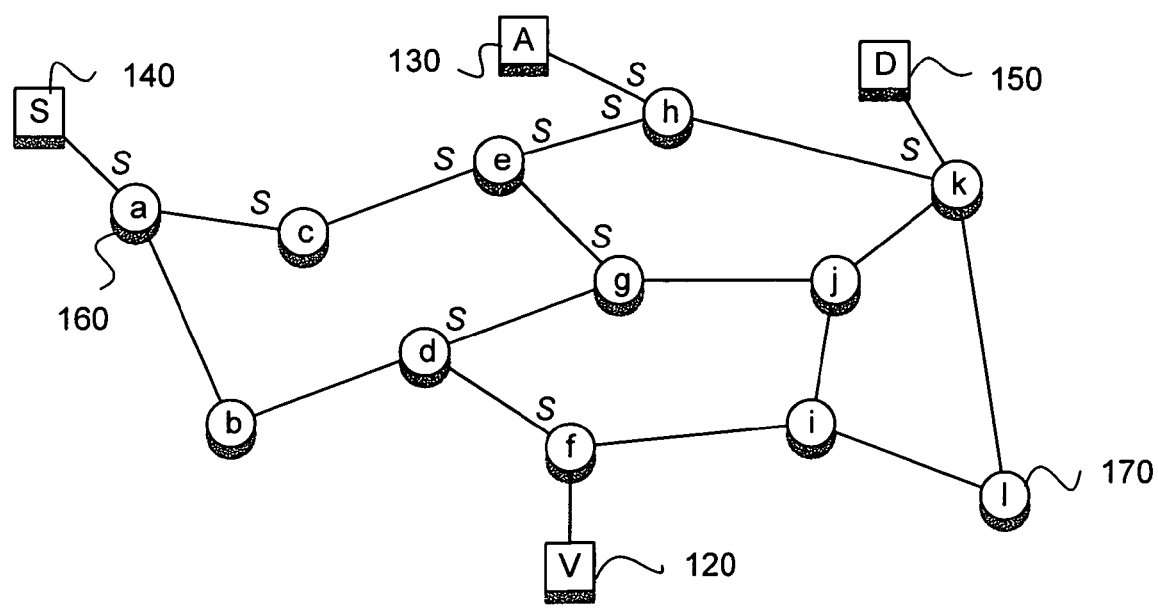
FIG. 9 is an illustration representing a network with markings for S's subnet entries, crossing path example.
Figure 10:
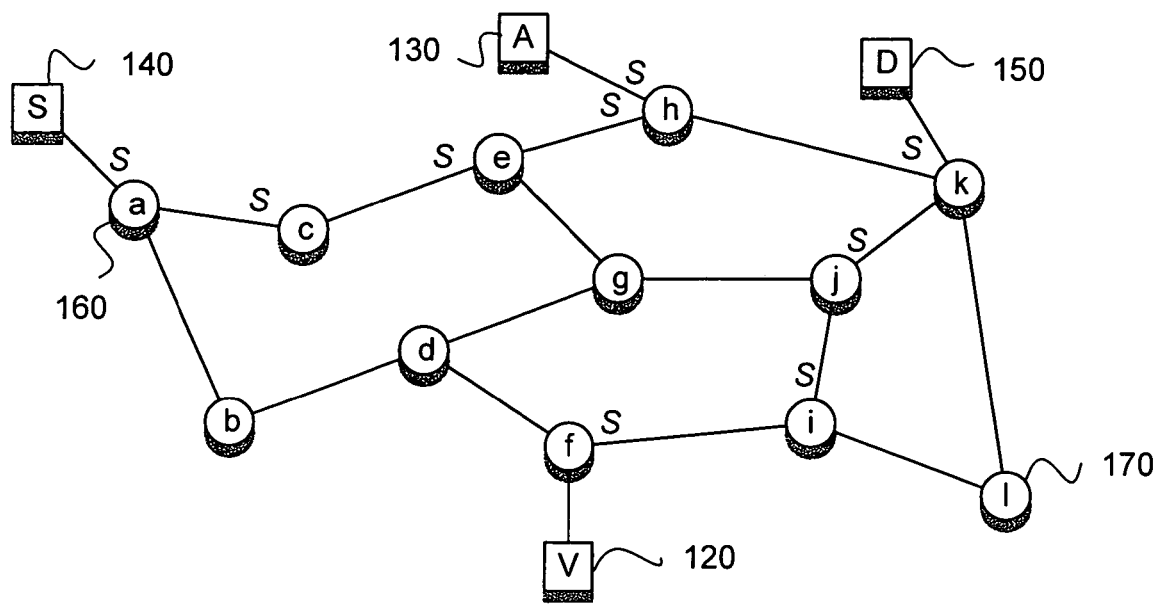
FIG. 10 is an illustration representing a network with markings for S's subnet entries, shared path segment example.

FIG. 9 shows the network marking state of the example of FIG. 7, while FIG. 10 shows the markings for the example of FIG. 8. Markings are shown graphically as an italic S above the end of each link as it enters a router. To keep the diagram simple and clean, only the markings in the forwarding entries for S's subnet are shown. No marking is done, or needed, at hosts.

The marked links in FIGS. 9 and 10 can be seen to correspond to the solid and dashed links in FIGS. 7 and 8 except for the final links to the hosts D 150 and V 120.

Note that the marked links along the path from host S 140 to D 150 are a subset of the links of the source tree rooted at S, shown in FIG. 6. In general, if there are multiple destinations to which S's subnet has recently sent packets, some subset of the paths in S's source tree will be so marked, and in the absence of spoofed traffic claiming S's subnet as an origin, no other links will be so marked.

On the other hand, the spoofed packet from Attacking node 130 will traverse part of the source tree rooted at Attacking node 130 since only the IP destination address is normally considered for forwarding packets, but the marking process will mark them in the forwarding table entries for the purported source, S. Thus, when a spoofed attack occurs, the network's marking state for the entries for S's subnet will be the union of some subset of S's source tree and some subset of A's source tree. In fact, Attacking node 130 may be attacking multiple victims 120 using the same spoofed source address S. If Attacking node 130 is originating multiple attacks using different spoofed source addresses, this traceback technique treats each as a separate traceback problem.

Figure 11:
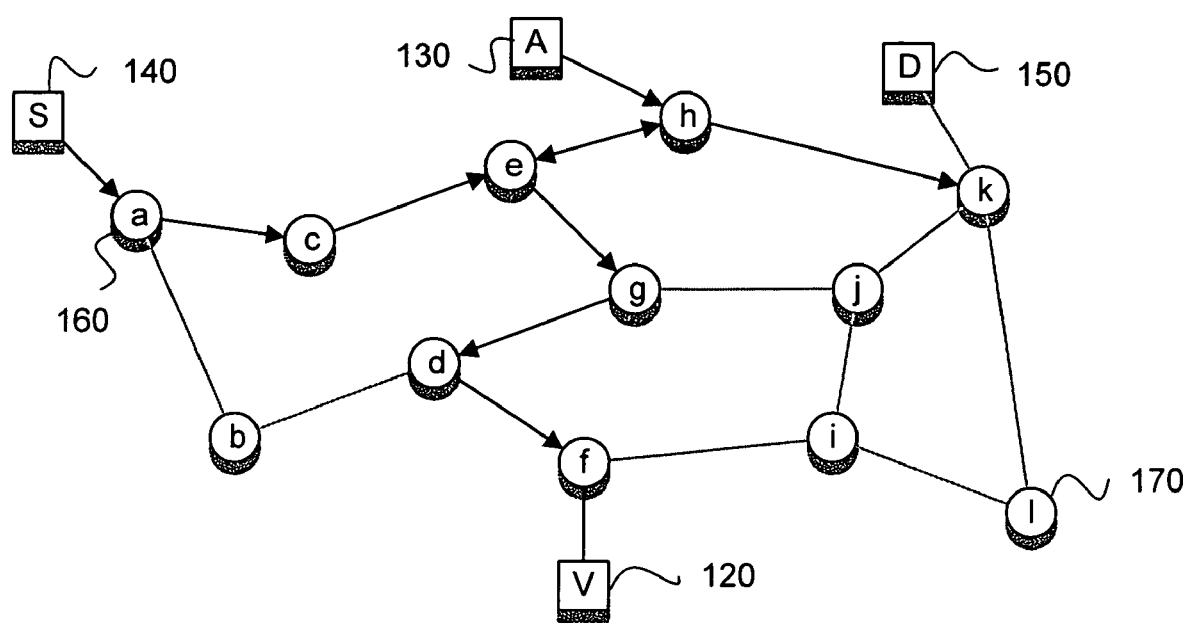
FIG. 11 is an illustration representing a network marked source tree, crossing path example.
Figure 12:
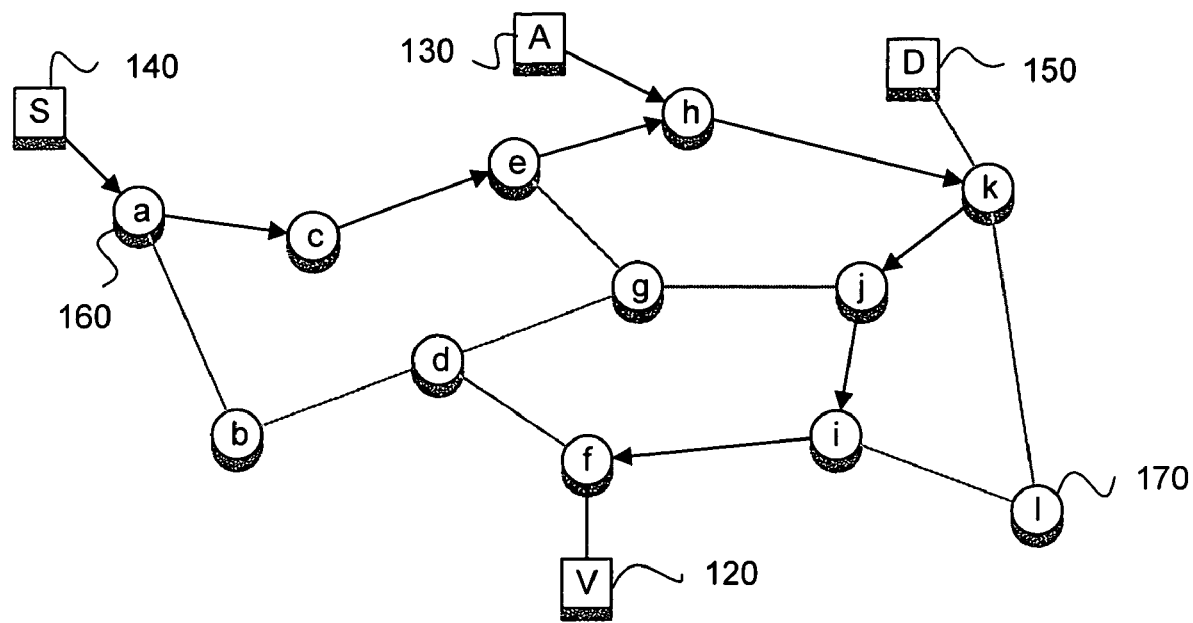
FIG. 12 is an illustration of an example network representing a marked source tree and a shared path segment.

The union of the two source trees (from S and A) will produce a graph with two roots: S and A. The graphs for the two examples are shown in FIGS. 11 and 12.

Collecting Source Path Records

Periodically, the router's main control processor collects the "use" or "used" bits and records them, along with a timestamp. Additional information about the forwarding table records might also be kept with the source path record, to associate each forwarding table prefix entry with the "used" bits for each interface. This might be done either explicitly (if routes are relatively unstable) or implicitly, keeping only routing deltas, if routes are relatively stable. The collection interval can be varied, and would probably be configured for each router; a typical value might be to collect the "used" bits for each prefix in the forwarding table once every 15 minutes, which is a typical measurement interval for collecting traffic statistics. Routing in most parts of the Internet are relatively stable over a 15 minute interval. However, any time interval may be used longer, shorter or varying as network conditions vary, and the time interval used will depend on the application.

Note that it is not crucial that routes not change during the collection interval; while the "branches" of the source tree for a given source S might change, the root node rarely does. Thus, a source path traceback graph like FIGS. 11 and 12 will typically have multiple ingress paths to an intermediate router, but all will still lead back to either S or A. Unsynchronized collection intervals in the routers, along with route changes, may occasionally cause a source path to "dead end".

However, examining temporally adjacent source path records at the expected upstream router will normally locate the path.

Once collected by the routers' control processors, the source path records can be used for traceback in at least two ways: Routers can retain the records, and support a query mechanism to examine them for specific traceback requests; this approach is similar to the SPE system design for traceback queries (see for example Snoeren et al., single packet IP Traceback Protocol, IEEE/ACM Transactions on Networking Vol. 10, No. 6 p. 721-734 (2002)), and a very similar architecture could be used; and The source path records could be sent to, or collected by, a centralized network monitoring system, which could archive them indefinitely. This would typically be done by having the network management system for the network extract the bits from a MIB table, using a management protocol such as SNMP For current Internet backbone routers, there are typically on the order of 500,000 forwarding table entries. Typical routers have 16 to 64 interfaces, though some have more. Such routers may have fewer routing table entries, however, since they are typically "metro" aggregation routers, which forward nearly all traffic to the network backbone.

Assuming 500,000 routes and 64 interfaces, the storage required for the "used" bits is about 4 Mbytes. Collecting this every 15 minutes requires a bandwidth of about 32 kbits/sec. While this is substantially more traffic than current network management practices incur, it is still a tiny fraction of typical network link bandwidth. Collecting this information from 1000 routers would require a bandwidth of about only 32 Mbits/sec—well within the processing capability of a typical desktop workstation.

Including the whole routing prefix entry with each 64-bit interface record would only increase the record size by about 50% (for IPv4, for IPv6 it would triple the record size, if no techniques were used to compress the data). Even with the additional data included, the data storage requires in the routers and network collection agent, and the bandwidth between them, would be reasonable for a large network. Also, any data compression technique known in the art could be used to reduce the storage and transmission bandwidth requirements. Thus, the above described alternative embodiment offers a practical option, and the additional complexity of including agents in the routers—may be required. Also, collecting and processing this data in the network management system may produce additional benefits, some which are described in the following.

Backtracing an Attack Using Source Path Records

There are several methods to use source path records to locate the actual source of an attack packet, depending on how data is collected, how administrative boundaries are organized relative to the network topology, and whether all routers involved in the trace are capable of collecting source path records.

Ubiquitous Collection, All Source Path Records Available, Simple Traceback

The simplest traceback method starts at the victim host 120 and steps back along the source trees as indicated by the source path records for S's subnet prefix. The first router back along the tree is normally the one used by default by V 120 node's protocol stack to forward off-subnet IP packets. However, if 120 node's subnet is connected to multiple other subnets, or connected by multiple routers, all of the routers attached to 120 node's subnet are to be queried.

Typically only one router will have evidence of the passage of a packet from the source prefix for S. Let this be router r1. r1, V, and the link r1-V are added to the source tree T. All of r1's ingress interfaces may be checked for a source path record for S's prefix. For each interface found, all neighbor routers on that interface (as determined from r1's routing or configuration data) are put on the candidate list C. Each router on C is examined in turn, and if any of them have a source path record for S's prefix, that router, and its link to r1 are added to the source tree T. The process then recurs, for each router in C that was added to the source tree T. The tracing process stops when either an interface is found which is directly connected to S's subnet, or no further upstream router exists for a given ingress interface. The latter case typically occurs for an interface directly attached to A's subnet, and the trace process indicate the attached subnet (which can be determined from router configuration data) as the probable location of the attacker A.

Figure 13:
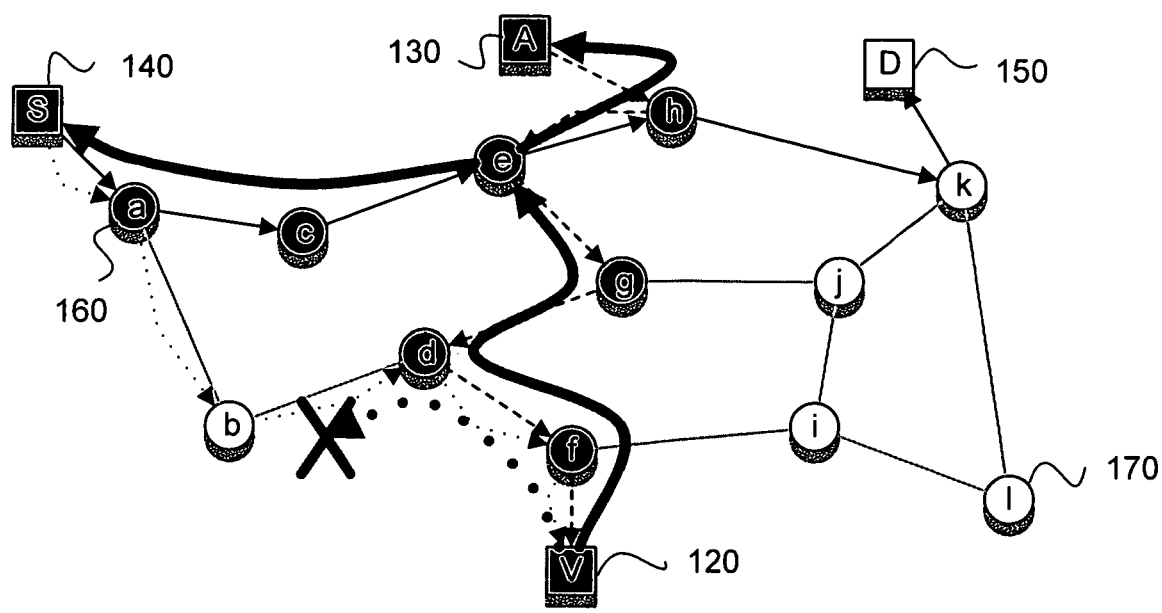
FIG. 13 is an illustration of an example network representing a traced source tree and a crossing path example.
Figure 14:
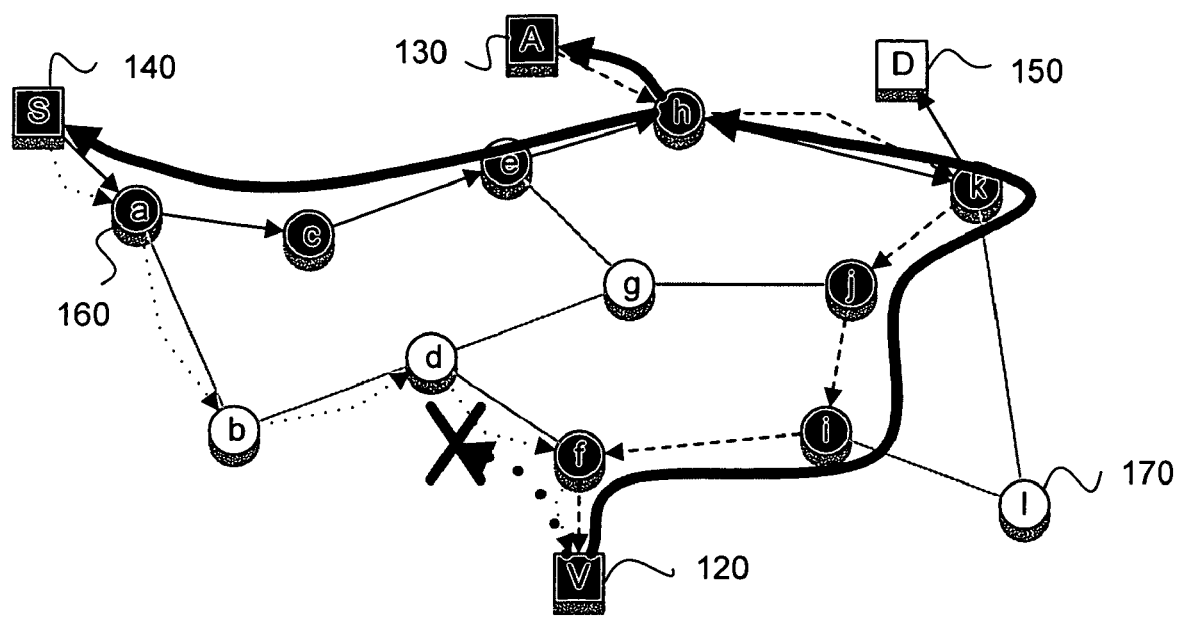
FIG. 14 is an illustration representing a network including a traced source a tree, and a shared path segment.

This process is illustrated in FIGS. 13 and 14 for the example situations depicted in FIGS. 7 and 8.

Ubiquitous Collection, All Source Path Records Available, Global Source Tree Computation If source path records are routinely collected at a central point, the network graphs shown in FIGS. 9 and 10 can be constructed. Then, a global reversed source tree computation can be made using them, by following all of the marked ingress links in reverse. This is illustrated for the two examples in FIGS. 15 and 16. As will be noted, these figures are essentially the same as FIGS. 11 and 12, but with the direction of each link reversed to point at the source. Hence the term "reversed source tree."

Internet routing is often not symmetrical, thus this tree is distinct from the "reverse path forwarding" tree that would be used for IP multicast forwarding for S and A, and cannot typically be constructed directly from routing data, as the multicast reverse path trees are. Note that this tree is computed globally, and does not follow a single path back to the root or multiple paths back to the root S and the spoofing root A. Therefore, branches to destinations other than Victim 120 are seen in this tree, but not in FIG. 13.

In both examples, it can be seen and computed with standard graph algorithms that the tree has branches to multiple root nodes, which does not happen in normal operation of IP-based networks.

Partial Collection, All Source Path Records Available

As noted above, It is quite likely that at least some routers in the Internet or any other network on which the systems described herein are used will lack source path recording capability. This will generally preclude the step-by-step traceback technique described, but the global source tree computation may still be made, and a possible attack source identified. If the router at which the reverse source tree forks is instrumented, there is strong evidence (from the fork) that an Attacking node 130 is source-spoofing S's address. Further information may be available about A's location, depending what source path records are available, and on the availability of related data, particularly for example IP routing information for the time in question.

Figure 17:
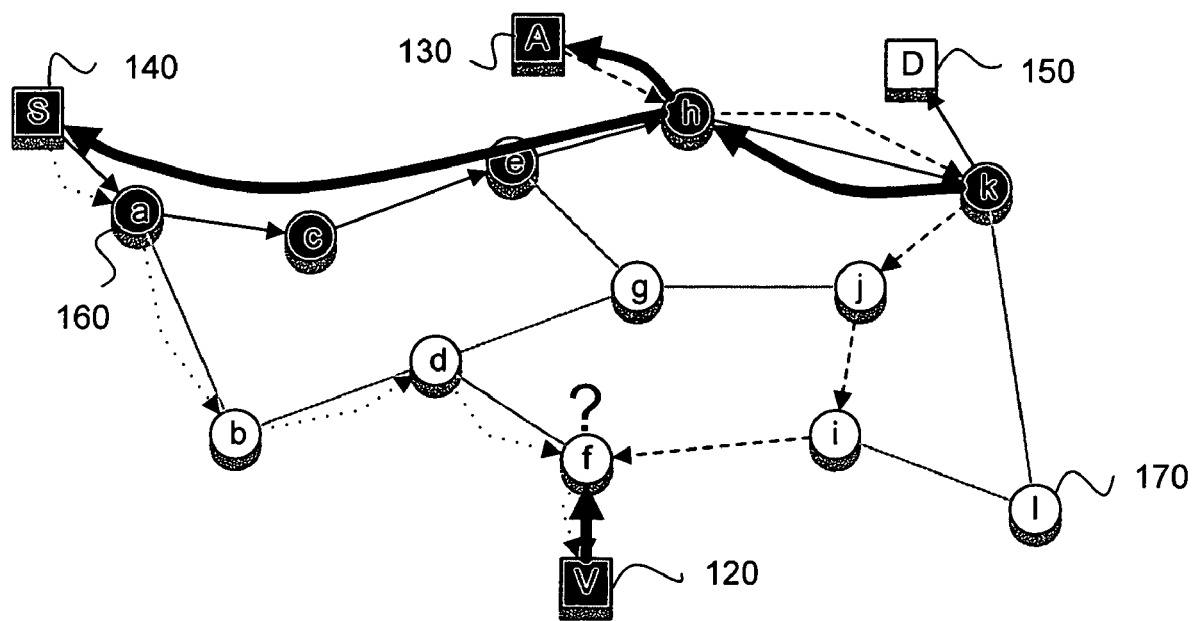
FIG. 17 is an illustration representing a network including globally-computed source tree with partial knowledge and shared path.

For example, in the traceback graph of FIG. 14, assume routers 160 *d, g, f, i,* and *j* are not instrumented with source path recording, A global source tree computation will then yield the result shown in FIG. 17.

The Attacking node 130 and true source S can still be identified and distinguished in FIG. 17, though there is no longer direct evidence of how the attack actually reached node V 120.

If, however, router 160 *h* were not instrumented, there would be no evidence of the source path fork to A, since A is on a subnet directly attached to 160 *h* in this example. In general, however, even if the fork point is not instrumented, there may be upstream evidence of two forks.

Interpreting partial source tree graphs in such cases will depend on the availability of IP routing data from a number of points across the network, and would typically require the use of a skilled network engineer with skill in IP routing or a program embodying such knowledge, to determine if a given source tree fragment plausibly belonged to S's source tree, or to the attacker A's, and, if so, what part of the network A might be attached to. However, the processes described herein provide the traceback information, even for a partially instrumental network, to allow identification of the attacker node A 130.

Moreover, IP routing data is often gathered by ISPs for operational purposes, as well as by outside organizations monitoring the Internet for research purposes (such as The Cooperative Association for Internet Data Analysis, "CAIDA", or by commercial network quality monitoring organizations which generate independent performance evaluation reports about ISPs for ISP customers.

Figure 15:
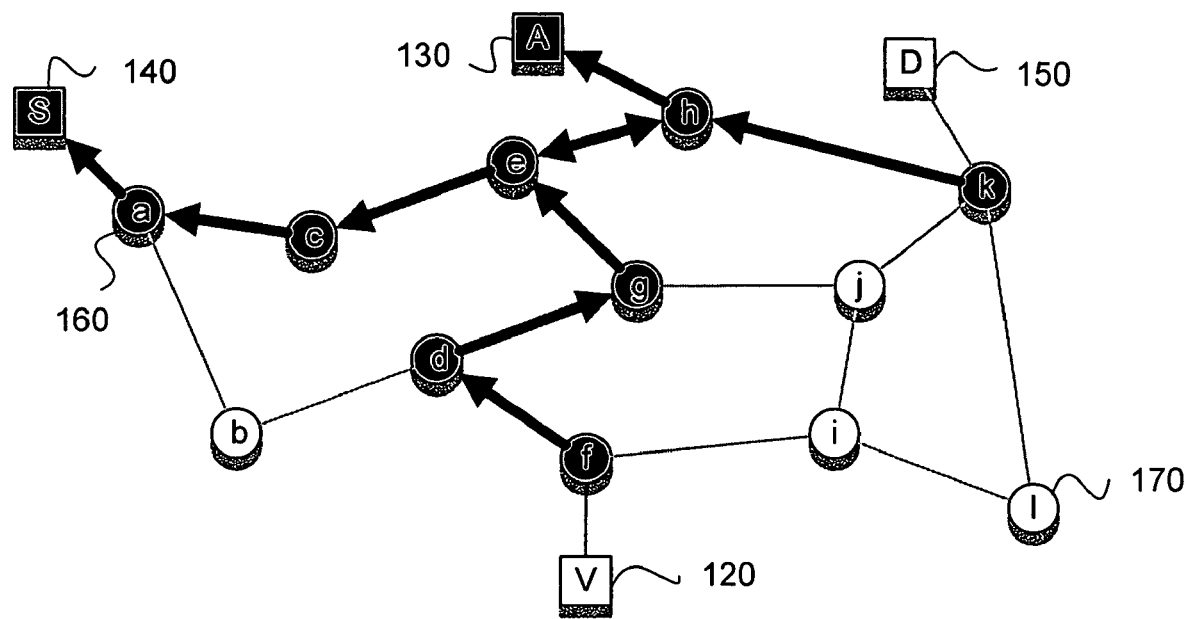
FIG. 15 is an illustration representing a network including globally-computed source tree and crossing path.
Figure 16:
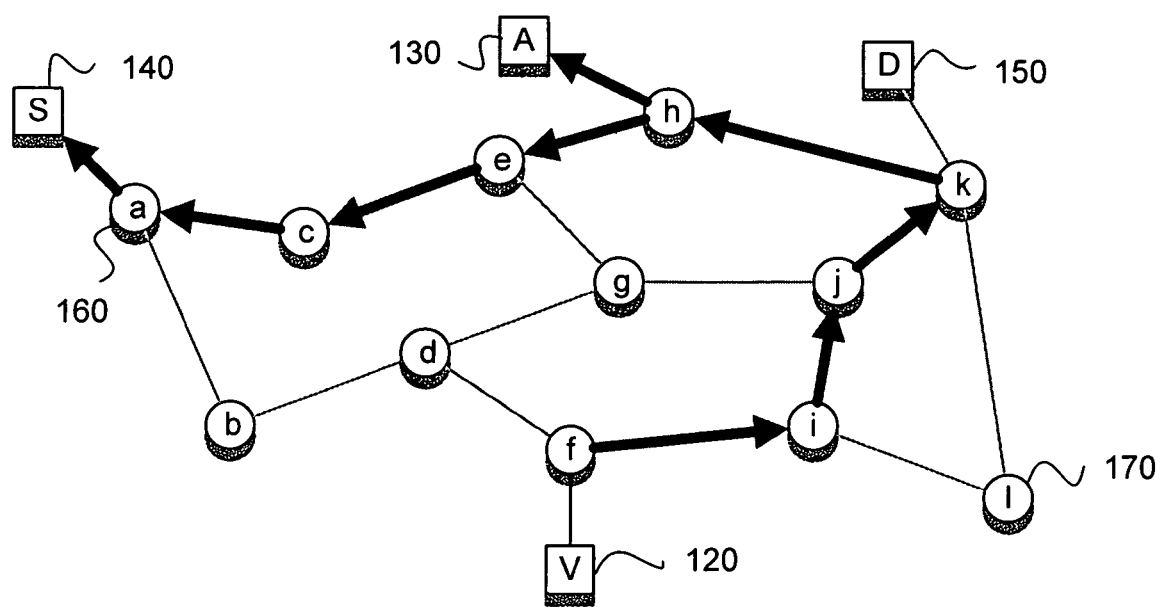
FIG. 16 is an illustration representing a network including globally-computed source tree, and shared path segment Example.
Figure 18:
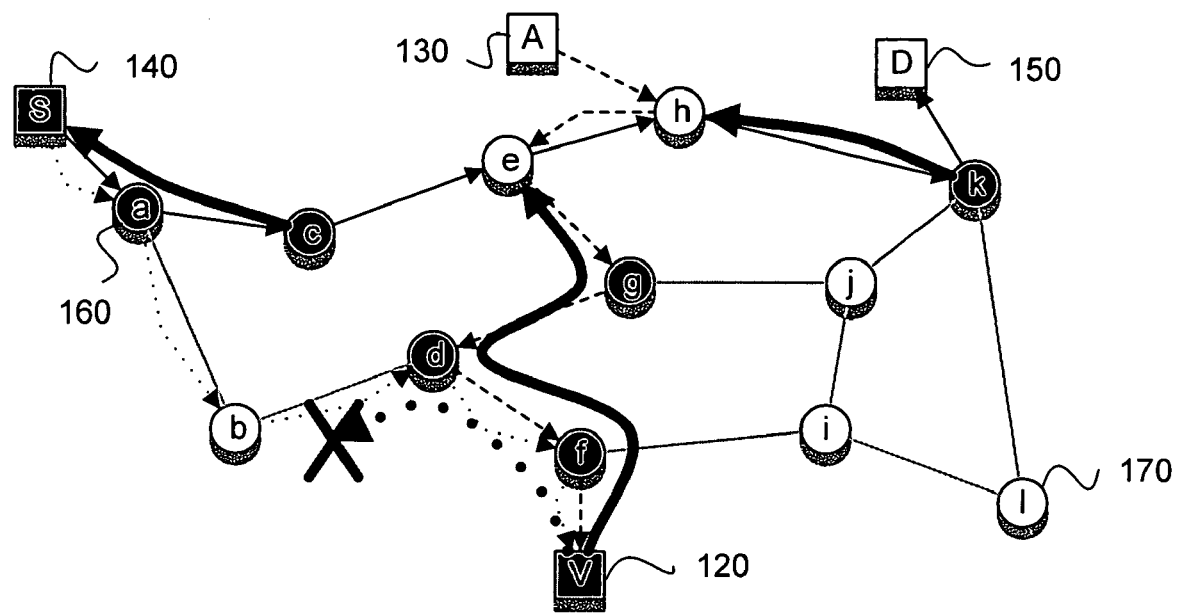
FIG. 18 is an illustration representing a network including globally-computed source tree with partial knowledge and crossing paths.

Similarly, FIG. 18 shows a variant of the global source tree computation example of FIG. 15, where routers 160 *e* and *h* lack instrumentation.

While there is no direct evidence of A 130, or its actual location, to a person skilled in Internet routing, the fact that there was no ingress traffic from 160 *b*'s link to 160 *d*, along the shortest route from node S 140 to node V 120, strongly implies that the attack did not originate at node S 140. Furthermore, the fact that traffic purported to be from node S 140, and along an active source path to node V 120, entered 160 *g* from 160 *e*'s link would suggest to a routing expert that the attack probably originated at some ingress link at 160 *e* or 160 *h*. (160 *c* can be eliminated as the attack source, since 160 *c* was instrumented, and recorded traffic only from 160 *a*, and 160 *c* is not on the most direct route to Victim 120 from node S 140, though it would lie on the most direct route from A 130, if A 130 had been directly attached to 160 *c* instead of 160 *h*.)

Partial Access to Source Path Records

If some subset of the source path records can be queried or obtained, the traceback problem is identical to the prior case, where the routers in question lack source path instrumentation.

Note that traceback method may be understood to provide facts to determine the source of the attack packet, and not to prove the attack packet being traced actually came from a particular source—it cannot tell whether the specific packet came from A or S. However, there are no legitimate reasons for a host to send source-spoofed packets. Thus, the conjunction in time of the attack with the discovery of a contemporaneous source path back to an origin other than S is a very strong circumstantial indication that the attack packet probably originated at A rather than S. Also, knowledge of network routing at the time can confirm or deny the hypothesis that A was the source of the attack packet, since the route of the attack packet must lie along A's source tree, and the traces left in the source path records would have to lie along either A's or S's source trees, if the suspect A is the actual attacker. Also, for the attack packet to have come from A to V, all instrumented interfaces along the route (at the time of the attack) should show a marked source path record for S's subnet.

In a further aspect of the invention, if all source path records are collected for the entire network, or a large, connected, subpart of it, it should be possible to detect potential attacks employing source address spoofing, even if no attack is reported to the tracing system. This is done by using the source path records to compute the source tree for every prefix in the routing tables of the network, and checking for multiple root nodes for each prefix.

The Source path records determine by the systems and methods described above may be used for tracing the source of an attack packet. However, the use of the source path records are no so limited and may be used for network operations, as well as to support traceback of spoofed packets. Possible uses include: Detection of communication patterns across peering points, in support of service agreements between ISPs for traffic exchanges between them, and for transit traffic. Detection of communications patterns of distributed application, such as file-sharing, in support of traffic engineering, customer service agreement enforcement, and copyright violation detection. Detection of routing anomalies, such as misconfigured routers, incorrect BGP route filtering at peering points (on either side of the peering point), or malicious attacks on network routing information.

It may be infeasible for a router with many interfaces to have a "used" bit for each interface in each forwarding table entry. This is especially likely for a single physical interface which is "channelized" into multiple logical interfaces, such as an OC-12 SONET/ATM interface with thousands of open ATM virtual circuits, or a DS-3 (45 Mb) interface carrying 28 DS-1 (1.5 Mb/s) sublinks routed to different destinations via the telephone circuit-switching infrastructure.

In this case, the router could aggregate multiple interfaces into a single "used" bit, since checking the state of the corresponding bit in neighboring routers would often find only one or two adjacent routers which had seen traffic from that source. The effect of such aggregation on the overall reliability of the traceback result may depend on the topology.

In one alternate embodiment, a router might only keep a single "used" bit per forwarding table entry, indicating that traffic from that source had passed through that router, but not indicating which interface(s) were involved. While this practice may introduce ambiguity in the traceback process, it is better than keeping no information at all and may provide some data for determining a source path through the network.

Other Means for Source Path Recording

The methods described are not limited to using IP forwarding tables to record the source path, nor does it require an actual source address lookup comparable to the destination lookup used for forwarding. These are merely convenient data structures and algorithms already present in IP routers, and data recorded using them is also useful for other purposes.

For example, a single "flat" bit table could be used for IPv4 source address recording, and it would contain only the "used" bit (again on a per-interface basis) and be indexed by some fixed number of the upper bits of the source address (e.g. 16 to 20 out of the 32). A 16-bit indexed table would require only 8 kbytes of memory per interface, and a single read-modify-write memory access to maintain. In many cases, a 16-bit prefix recorded this way would be sufficient to backtrack to the actual source machine.

For longer addresses, such as those used in IPv6, the source address might be hashed, instead, and stored in a Bloom filter similar to those used by the above referenced SPIE system SPIE. In such embodiment, the hash value is used to generate a set of mathematically-independent subfields, each of which is used to index the bit array. When a query is performed to see if a particular address prefix passed through the data collector, the address prefix of the source of the packet being queried about is hashed the same way, and the same subfields are used to look up (but not set) the bits in the array. If all the bits are found to be set, the source address is known to have passed through the data collection point, with some calculable probability based on the density of '1' bits in the filter and the number of sub-indexes used in the filter (The system will typically use 5 sub-index fields from each hash value, but any suitable amount may be used. However, in IP backbone routers, the storage required to keep the table might become comparable to SPIE, since backbone routers see traffic from a very large number of source addresses over the course of several minutes. Determining an effective table size will require, and would be linked to expected behavior of IP traffic, which often changes in major ways as the Internet and IP-based applications evolve.

Egress Source Path Recording

In those embodiments having partial source path instrumentation in the Internet, it may be desirable for routers supporting source path recording on ingress links to also support "used" bits in the forwarding prefix records representing egress links (a.k.a. "next hops"). Generally, this is needed only if the next hop router does not support source path recording, or uses simple default routes, which may often be the case if the next hop is a router at an enterprise border.

To perform egress source path recording, an instrumented router performs the source path lookup after the forwarding computation is completed, and the next hop router is known. Each next hop router (or subnet) would be represented in the prefix entry with a "used" bit, akin to the ones for each ingress interface. "Used" bits in the source prefix entry would be set corresponding to both the ingress interface and egress next hop.

Early Warning System

Rather than just set the "used" bit in a source path record for a particular interface, the recording process could also keep the prior state of the bit for each interface from the prior reporting interval, and if the bit was not set in the prior interval, generate a "new source path" event to report to the collection center that processes source path data.

However, such changes can represent normal network behavior such as routing shifts, as well as source spoofing, so the central collection system would then have to examine the report together with routing data to determine if the new source path was simply a normal routing change, or likely due to a source spoofing host. If the new source path appeared to be consistent with a spoofed source, then an alert of a probable attack could optionally be issued for possible action by network operators and law enforcement agencies.

Spoofed Packet Tracing in Non-IP Networks

The systems and methods described herein are not limited to Internet Protocol networks, and may be applied to, among others, any packet-switched network where source addresses are present and can be spoofed by the sender (e.g., Ethernet networks). However, the design may need to be adapted to other network types. In particular, Ethernet switches generally lack an IP-style forwarding table, and addresses are routed entirely by full address, and by topological considerations (e.g. the spanning tree algorithm). In this type of packet switch, the source address path can readily be recorded in a per-interface (or per-port) hash table, since the total number of nodes on such networks is typically on the order of a few thousand, at most.

The invention may be embodied in other specific forms without departing from the spirit or essential characteristics thereof. As discussed above, the systems and methods described herein may be realized as one or more software components operating on a conventional data processing system, such as a network router, a network applicant, or other data processor such as a Unix workstation. In such an embodiment, the systems can be implemented as a C language computer program, or a computer program written in any high level language including C++, Fortran, Java or BASIC. Additionally, in an embodiment where embedded processor systems such as microcontrollers or DSPs are employed, the system or components of the system can be realized as a computer program written in microcode or written in a high level language and compiled down to microcode that can be executed on the platform employed. Additionally, although the figures graphically depicts the traceback system as flow processes occurring between components of a network, it will be apparent to one of ordinary skill in the art that the systems described herein can be realized as computer programs or network components that together can traceback the source of a network communication and that these components as well as the systems they together provide, are all aspects of the inventions described herein.

The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A method for tracing source spoofed network communications on a network comprising:
   providing a table, which is configured to include:
      a single entry for each of a plurality of distinct sub-blocks of source addresses, wherein each distinct sub-block of source addresses corresponds to a plurality of source addresses on the network capable of sending a network communication; and
      a plurality of use bits, each associated with respective ones of the plurality of distinct sub-blocks of source addresses;
   when a network communication arrives, modifying the use bit corresponding to at least one sub-block of source addresses associated with the network communication; and
   analyzing the use bits to trace the source of a spoofed network communication being forwarded over the network.

2. The method according to claim 1 wherein analyzing further comprises compiling a partial list of use bits at specified time intervals.

3. The method according to claim 2 further comprising resetting the use bits at specified time intervals.

4. The method according to claim 2 wherein, the compilation is performed by either a network operations center or a third party agent.

5. The method according to claim 1 further comprising collecting use bits responsive to an investigation command.

6. The method according to claim 1 wherein providing a plurality of use bits includes modifying a look-up table of a router on a network to associate the plurality of use bits with a plurality of source addresses in the look up table.

7. The method according to claim 1 further comprising collecting use bits having a second binary value.

8. The method according to claim 1 further comprising iteratively querying use bits of one or more nearest neighbor routers until a source subnet is traced for the network communication.

9. The method according to claim 1, wherein analyzing comprises:
   polling a neighbor nearest a router to determine if the neighbor has forwarded a network communication exhibiting a spoofed sub-block of addresses.

10. The method according to claim 9, wherein analyzing the tracing comprises:
iterating the query, if the neighbor has forwarded a network communication exhibiting the spoofed sub-block of addresses, by polling the neighbor's neighbors.

11. The method according to claim 1 further comprising using network routing and topology data to trace the source of a spoofed network communication and identify an attack path.

12. The method according to claim 11 further comprising collecting data from a subset of nodes of an attack path.

13. The method according to claim 1 further comprising recording an interface from which the network communication is received.

14. The method according to claim 1 wherein, the sub-block of addresses comprises all address bits.

15. The method according to claim 1 further comprising applying a hashing function or Bloom filter to the address bits.

16. The method according to claim 1 further comprising detecting routing errors based on, at least in part, the use bits.

17. The method according to claim 1 further comprising determining routing related SLA violations based on, at least in part, the use bits.

18. The method according to claim 1 further comprising periodically compiling use bits to detect unexpected network communications.

19. The method according to claim 1 further comprising periodically compiling the use bits and analyzing the compilation to determine network traffic patterns.

20. The method according to claim 19 further comprising determining network connectivity between two or more network nodes.

21. The method according to claim 1, wherein analyzing the use bits comprises responding to a query regarding receipt of a packet from a node having an address within one of the sub-blocks of source addresses based on a value of a corresponding use bit.

22. The method according to claim 21 further comprising iterating the query to at least one neighboring node.

23. The method according to claim 1, wherein the single entry for each of the plurality of distinct sub-blocks of source addresses correspond to distinct subnets within the network.

24. The method according to claim 23, wherein the plurality of source addresses correspond to network devices associated with a respective distinct subnet.

25. The method according to claim 1, wherein the single entry for each of the plurality of distinct sub-blocks of source addresses is a Internet Protocol source address prefix.

26. A method for tracing a source spoofed network communication having a source spoofed prefix over a plurality of routers comprising:
providing a plurality of look-up tables associated with respective ones of the plurality of routers configured to include:
a single entry for each of a plurality of distinct source prefixes, wherein each distinct source prefix corresponds to a plurality of addresses on a network; and
a plurality of use bits, each associated with respective ones of the plurality of distinct source prefixes;
upon arrival of a new network communication, looking up a source prefix in a look-up table, the source prefix being contained in the network communication header;
if the source prefix is found within the look-up table, writing a first binary value to the use bit associated the found table entry;
if the source prefix is not found within the look-up table, writing a new table entry into the look-up table; and
collecting at least a partial list of the look-up table from to trace the source of a spoofed network communication being forwarded over the network.

27. The method according to claim 26 further comprising compiling all the table entries in the first router at predetermined time intervals.

28. The method according to claim 26 further comprising collecting all the table entries containing use bit with the first binary value from the first router.

29. The method according to claim 26, wherein a second binary value in the user bit represents that a network communication containing a source prefix in its network communication header has not been forwarded by the first router.

30. The method according to claim 29 further comprising writing the second binary value to each of the collected table entries.

31. The method according to claim 30 further comprising substituting a internet protocol destination look-up table disposed in the first router with a first look-up table.

32. The method according to claim 26, wherein each table entry of the look-up table further comprises a time stamp field.

33. The method according to claim 26 further comprising writing a time stamp in each table entry when the first binary value is written to the user bit in each of the table entries.

34. A system for tracing a source spoofed network communication, comprising:
a table configured to include a single entry for each of a plurality of distinct sub-blocks of source addresses, wherein each distinct sub-block of source addresses corresponds to a plurality of source addresses on the network capable of sending a network communication, and
a plurality of use bits, each associated with respective ones of the plurality of distinct sub-blocks of source addresses,
a look up process for, when a network communication arrives, modifying the use bit corresponding to at least one sub-block of source addressed associated with the network communication; and
a traceback agent for analyzing the use of bits to trace the source of a spoofed network communication being forwarded over the network.

35. A method for tracing source spoofed network communications on a network in which nodes on the network maintain tables that are configured to include a single entry for each of a plurality of distinct sub-blocks of source addresses and use bits, wherein each distinct sub-block of source addresses corresponds to a plurality of source addresses, and wherein each use bit is associated with respective ones of the plurality of distinct sub-blocks of source addresses, the method comprising:
polling the tables of a first set of neighboring nodes to determine, based on use bits stored in the tables, if any of the nodes in the first set of neighboring nodes received a communication from a node in a sub-block of source addresses associated with a spoofed network communication;
receiving at least one response to the poll;
in response to a responding node indicating that it had received a communication from the sub-block of source addresses with the spoofed network communication, querying the routing tables of a second set of nodes neighboring the responding node, to trace the source of the spoofed communication.

* * * * *